US011965356B2

(12) United States Patent
Basavaraju et al.

(10) Patent No.: US 11,965,356 B2
(45) Date of Patent: Apr. 23, 2024

(54) STATUS-INDICATING CYLINDRICAL LOCK ASSEMBLY

(71) Applicant: Schlage Lock Company LLC, Carmel, IN (US)

(72) Inventors: Smitha Basavaraju, Bangalore (IN); Kenton H. Barker, Colorado Springs, CO (US); Harikrishnan Mannattil, Parappanangadi (IN); Subbiah Gopalakrishnan, Trivandrum (IN); David J. Hurlbert, Manitou Springs, CO (US); Ajeya S. Rao, Mangalore (IN); Achyuta Dhanvantri, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 17/720,550

(22) Filed: Apr. 14, 2022

(65) Prior Publication Data

US 2022/0235576 A1 Jul. 28, 2022

Related U.S. Application Data

(63) Continuation of application No. 16/423,975, filed on May 28, 2019, now Pat. No. 11,306,506, which is a (Continued)

(51) Int. Cl.
*E05B 17/10* (2006.01)
*E05B 27/00* (2006.01)
(Continued)

(52) U.S. Cl.
CPC .......... *E05B 17/10* (2013.01); *E05B 27/0092* (2013.01); *E05B 41/00* (2013.01); *E05B 55/005* (2013.01); *E05B 2047/0067* (2013.01)

(58) Field of Classification Search
CPC .......... E05B 63/06; E05B 63/08; E05B 63/10; E05B 15/00; E05B 9/00; E05B 17/10;
(Continued)

(56) References Cited

U.S. PATENT DOCUMENTS 1,944,469 A 1/1934 Schlage
2,793,522 A 5/1957 Tornoe
(Continued)

FOREIGN PATENT DOCUMENTS

EP 2284338 A2 2/2011
WO 2007134383 A1 11/2007

OTHER PUBLICATIONS

Indicator Locks Bathroom & Bedroom Privacy Commercial & Residential Use Reversible for Left & Right Door Opening Large Occupancy Inscription "IN-USE" or "VACANT", www.indicatorlock.com, 2 pages.

(Continued)

*Primary Examiner* — Suzanne L Barrett
(74) *Attorney, Agent, or Firm* — Taft Stettinius & Hollister LLP

(57) ABSTRACT

In one form, a cylindrical lockset includes a chassis including a pair of hubs, a pair of drive tubes, a retractor, and a lock control assembly. The lock control assembly has a locked state and an unlocked state. The lock control assembly also has a plurality of movable elements, each having a locking position and an unlocking position. One of the hubs includes a guide channel, and a slider is movably seated in the guide channel. One of the movable elements is associated with the slider, and is configured to move the slider between a lock-indicating position and an unlock-indicating position.

19 Claims, 17 Drawing Sheets

Related U.S. Application Data continuation of application No. 15/608,378, filed on May 30, 2017, now Pat. No. 10,301,843.

(60) Provisional application No. 62/342,424, filed on May 27, 2016.

(51) Int. Cl.
*E05B 41/00* (2006.01)
*E05B 55/00* (2006.01)
*E05B 47/00* (2006.01)

(58) Field of Classification Search
CPC .... E05B 27/0092; E05B 41/00; E05B 55/005; E05B 2047/0067; E05B 27/0003; E05C 1/16; Y10T 70/7486
USPC .................................................... 70/344, 432
See application file for complete search history.

(56) References Cited

U.S. PATENT DOCUMENTS

| | | | | |
|---|---|---|---|---|
| 3,304,756 | A | 2/1967 | Eads | |
| 3,881,331 | A | 5/1975 | Tranberg et al. | |
| 4,490,999 | A | 1/1985 | Castle et al. | |
| 4,559,796 | A | 12/1985 | De Forrest, Sr. | |
| 4,683,741 | A | 8/1987 | Fields | |
| 5,335,948 | A | 8/1994 | Norton, II et al. | |
| 5,794,472 | A | 8/1998 | Kester et al. | |
| 5,945,648 | A * | 8/1999 | M'Sadoques | H01H 71/501 200/43.14 |
| 6,189,351 | B1 | 2/2001 | Eagan et al. | |
| 6,441,735 | B1 | 8/2002 | Marko et al. | |
| 6,584,818 | B2 | 7/2003 | Bates et al. | |
| 6,622,537 | B2 | 9/2003 | Rodriguez | |
| 6,860,129 | B2 | 3/2005 | Eller et al. | |
| 6,938,445 | B2 | 9/2005 | Huang | |
| 7,248,163 | B2 | 7/2007 | Wu | |
| 7,388,467 | B2 | 6/2008 | Fisher et al. | |
| 7,714,739 | B2 | 5/2010 | Schensky | |
| 7,866,195 | B2 | 1/2011 | Levine | |
| 8,037,725 | B2 | 10/2011 | Levine | |
| 8,690,205 | B2 | 4/2014 | Benitez et al. | |
| 9,187,928 | B2 | 11/2015 | Abel et al. | |
| 9,394,722 | B2 | 7/2016 | Moon et al. | |
| 10,301,843 | B2 | 5/2019 | Basavaraju et al. | |
| 11,078,686 | B2 | 8/2021 | Barker et al. | |
| 11,306,506 | B2 * | 4/2022 | Basavaraju | E05B 55/005 |
| 2002/0095957 | A1 | 7/2002 | Bates et al. | |
| 2006/0107713 | A1 | 5/2006 | Kugel | |
| 2013/0081434 | A1 | 4/2013 | Grant et al. | |
| 2014/0353980 | A1 | 12/2014 | Beck | |
| 2015/0013402 | A1 | 1/2015 | Murphy | |
| 2015/0225982 | A1 | 8/2015 | Bronner | |
| 2015/0252592 | A1 | 9/2015 | Tien | |
| 2015/0315816 | A1 | 11/2015 | Gopalakrishnan et al. | |

OTHER PUBLICATIONS

Von Duprin, Classroom Security Indicator brochure, May 2013, 1 page, No. 009598, Ingersoll Rand, US.
Schlage, Classroom Security Indicators brochure, Jun. 2013, 1 page, No. 009574, Ingersoll Rand, US.
Corbin Russwin, Classroom Security Solutions for Cylindrical and Mortise Locks flyer, Jan. 2013, 2 pages, No. 45313, Corbin Russwin Architectural Hardware, US.
Yale, Classroom Security Solutions for Cylindrical and Mortise Locks flyer, Feb. 2013, 2 pages, No. 42851, Yale Locks & Hardware, a division of Yale Security Inc., US.
Best, Securing A World Where They Are Free To Learn flyer, Apr. 2008, 2 pages, No. B-222, Best Access Systems, US.
Sargent, Classroom Security Solutions for Bored and Mortise Locks brochure, Jan. 2013, 2 pages, No. 90771, Sargent Manufacturing Company, US.
International Search Report; International Searching Authority, US Patent and Trademark Office; International PCT Application No. PCT/US2015/029035; dated Sep. 8, 2015; 2 pages.
Written Opinion of the International Searching Authority; International Searching Authority, US Patent and Trademark Office; International Application No. PCT/US2015/029035; dated Sep. 8, 2015; 7 pages.
International Search Report; International Searching Authority; International Patent Application No. PCT/US2017/035001; dated Aug. 14, 2017; 2 pages.
Written Opinion; International Searching Authority; International Patent Application No. PCT/US2017/035001; dated Aug. 14, 2017; 7 pages.

* cited by examiner

STATUS-INDICATING CYLINDRICAL LOCK ASSEMBLY

CROSS-REFERENCE TO RELATED APPLICATIONS

The present application is a continuation of U.S. patent application Ser. No. 16/423,975 filed May 28, 2019 and issued as U.S. Pat. No. 11,306,506, which is a continuation of U.S. patent application Ser. No. 15/608,378 filed May 30, 2017 and issued as U.S. Pat. No. 10,301,843, which claims the benefit of U.S. Provisional Patent Application No. 62/342,424 filed on May 27, 2016, the contents of each application are hereby incorporated by reference in their entirety.

TECHNICAL FIELD

The present disclosure generally relates to status indicators for cylindrical locksets, and more particularly, but not exclusively, relates to status indicators for classroom-type cylindrical locksets.

BACKGROUND

In certain settings, it may be desirable that a locking assembly provide a visual indication of the status of the assembly in order to enable a user to quickly determine whether the door is locked or unlocked. While mortise locksets include various features which facilitate the use of status indicators, the unique construction of cylindrical locksets has presented obstacles to providing a status indicator for such locksets. For example, certain mortise locksets allow for a direct connection between the deadbolt turn piece and the status indicator. In contrast, the mechanisms which provide the locking functionality in cylindrical locksets are often isolated from the visible portions of the assembly by a variety of elements, such as spring cages, mounting plates, and roses or escutcheons. These elements obstruct the path between the location at which the status of the locking assembly can be sensed and the location at which the status indicator would be mounted.

The above-noted difficulties are often compounded when it is desired to provide the status-indicator on the secured or inner side of the door. In many cylindrical locksets, the element which prevents the outside handle from operating the lockset is located near the unsecured or outer side of the door. This may result in an increased number of elements which obstruct the path between the location where the status of the lockset can be sensed and the location where the status is intended to be displayed, thereby further hindering the transmission of the lock status from the sensing location to the display location.

For these reasons among others, while certain conventional mortise locksets include visual status indicators, many current cylindrical locksets do not. Instead, certain current cylindrical lock assemblies include an arrow and the word “lock” (e.g., on the inner lock cylinder, inner lock handle, and/or inner lock rose) to indicate which way the key must be rotated to lock the lockset. In order to determine the status of the lockset, the user must approach the door, insert the key, and attempt to rotate the key in the locking direction. This is not only inconvenient, but can also put the user in danger, for example in an emergency situation where an armed intruder may be just outside the door.

Additionally, while certain current cylindrical locksets may include status indicators, many of these locksets are not able to be installed in a standard cylindrical door preparation. Instead, these locksets require additional preparation of the door, such as removing door material to form additional space. This process is not only time-consuming, but may be infeasible for certain types of doors, such as metal doors. Accordingly, there remains a need for further improvements in this technological field.

SUMMARY

In one form, a cylindrical lockset includes a chassis including a pair of hubs, a pair of drive tubes, a retractor, and a lock control assembly. The lock control assembly has a locked state and an unlocked state. The lock control assembly also has a plurality of movable elements, each having a locking position and an unlocking position. One of the hubs includes a guide channel, and a slider is movably seated in the guide channel. One of the movable elements is associated with the slider, and is configured to move the slider between a lock-indicating position and an unlock-indicating position. Further embodiments, forms, features, aspects, benefits, and advantages of the present application shall become apparent from the description and figures provided herewith.

DETAILED DESCRIPTION OF ILLUSTRATIVE EMBODIMENTS

Figure 1:
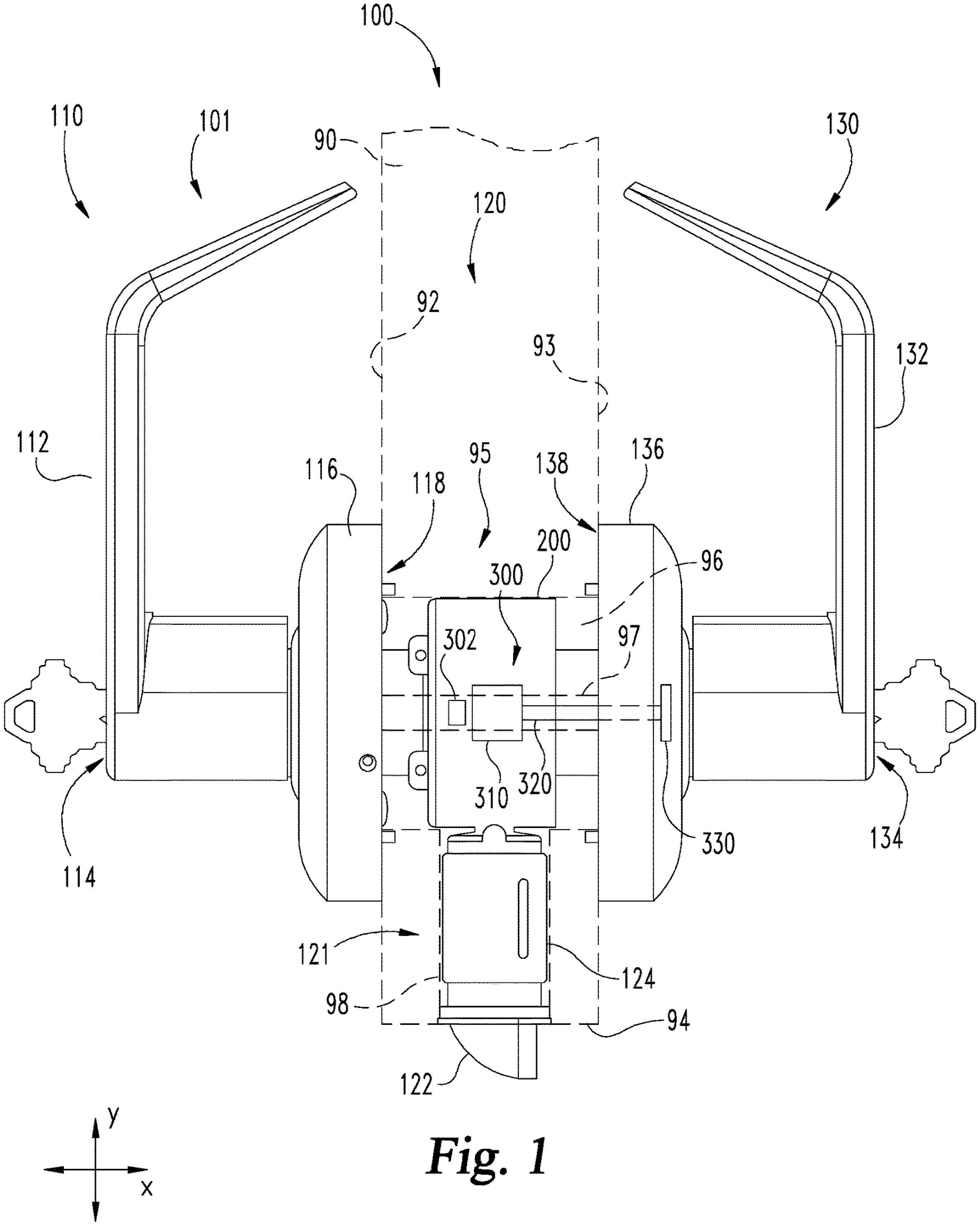
FIG. 1 is a schematic illustration of a cylindrical lock assembly including a status-indicating assembly according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein, the terms "longitudinal," "lateral," and "transverse" are used to denote motion or spacing along three mutually perpendicular axes. In the coordinate system illustrated in FIGS. 1 and 2, the X-axis defines the longitudinal directions, the Y-axis defines the lateral directions, and the Z-axis defines the transverse directions. Additionally, the X-axis may be considered to define two sets of longitudinal directions having different frames of reference. In a first frame of reference, "longitudinally inward" is the direction toward the center of the lockset 101, and "longitudinally outward" is the direction away from the center of the lockset 101. In a second frame of reference, "proximal" is the direction extending from the inner assembly 130 toward the outer assembly 110 (i.e., to the left in FIG. 1), and "distal" is the opposite direction (i.e., to the right in FIG. 1). These terms are used for ease of convenience and description, and are without regard to the orientation of the system with respect to the environment. For example, descriptions that reference a longitudinal direction may be equally applicable to a vertical direction, a horizontal direction, or an off-axis orientation with respect to the environment.

Additionally, motion or spacing along one direction need not preclude motion or spacing along another of the directions. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Figure 2:
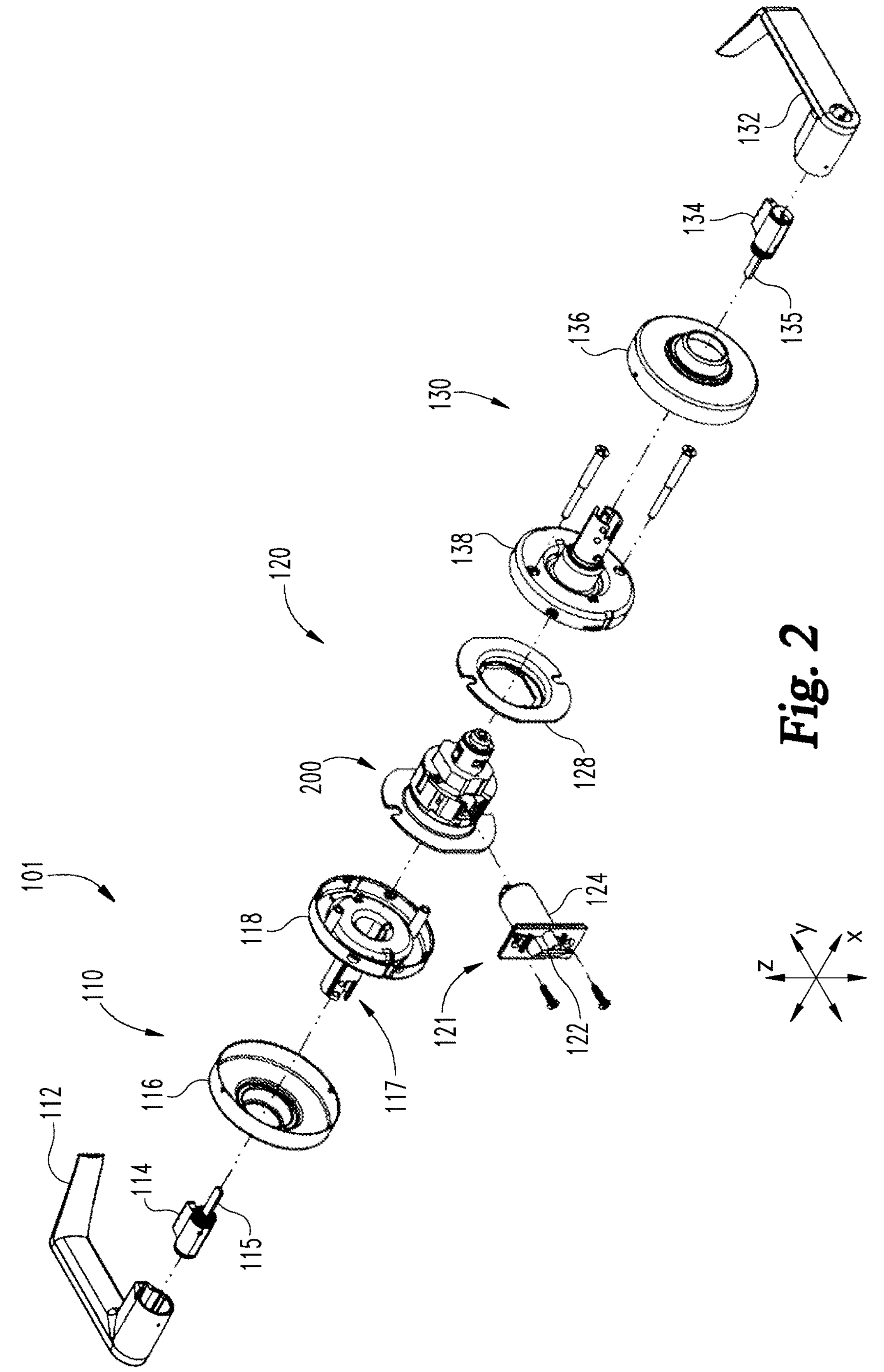
FIG. 2 is an exploded view of an exemplary cylindrical lockset.
Figure 3:
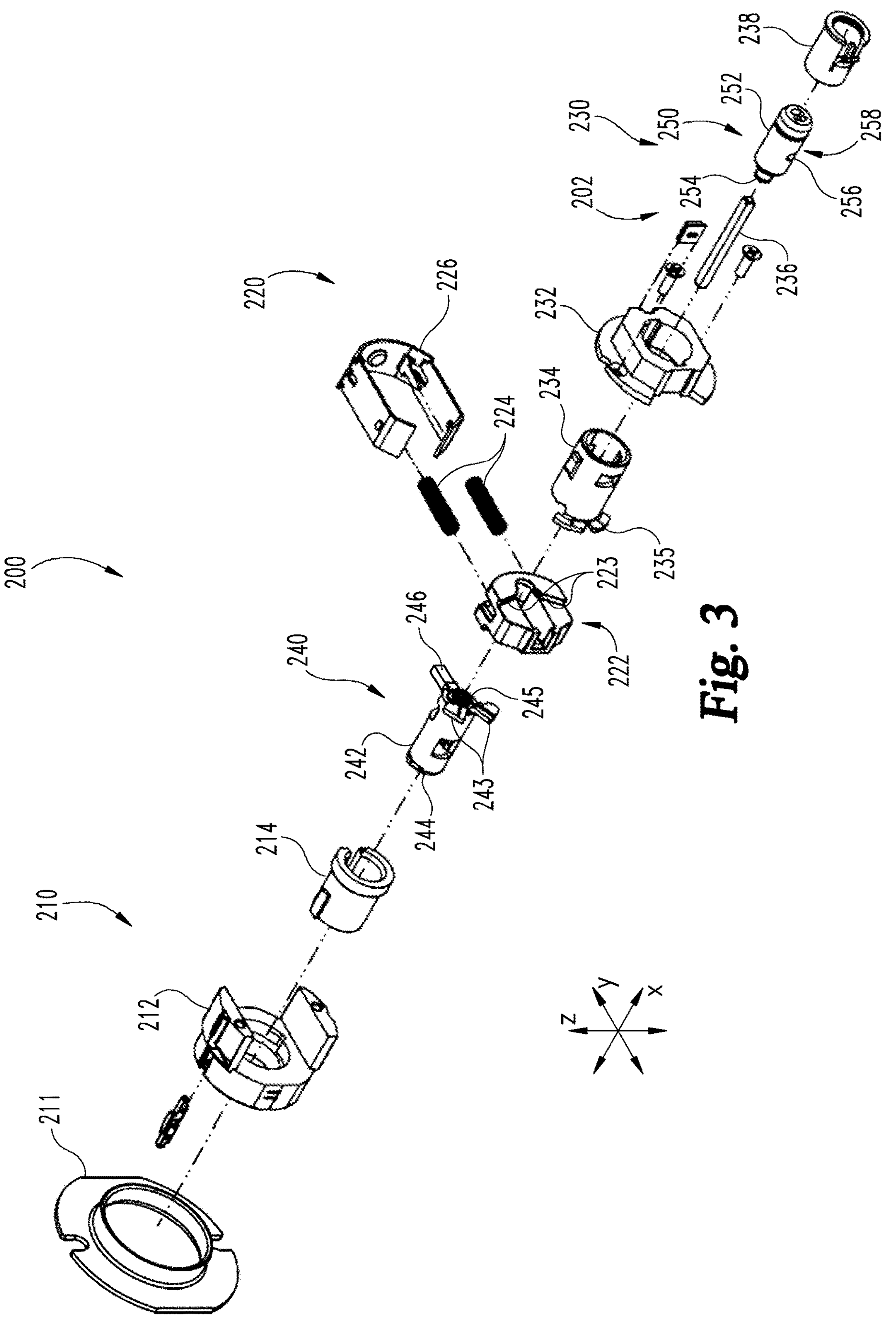
FIG. 3 is an exploded view of a chassis of the exemplary cylindrical lockset.

With reference to FIGS. 1-3, an exemplary status-indicating locking assembly 100 includes a cylindrical lockset 101 and a status-indicating assembly 300 according to one embodiment. The cylindrical lockset 101 includes an outer assembly 110, a center assembly 120 including a chassis 200, and an inner assembly 130. The locking assembly 100 may be installed on a door 90, for example to control access to a room or other space.

The door 90 includes an unsecured or outer side 92, a secured or inner side 93, an edge 94, and a standard cylindrical door preparation 95. The standard cylindrical door preparation 95 includes a cross-bore 96, a pair fastener bores 97, and an edge bore 98. The cross-bore 96 and fastener bores 97 extend longitudinally between the outer and inner sides 92, 93 of the door 90. The cross-bore 96 has a standard diameter (typically two and one-eighth inches), and the fastener bores 97 are positioned on diametrically opposite sides of the cross-bore 96. The edge bore 98 extends laterally from the edge 94 of the door 90 to the cross-bore 96.

When the lockset 101 is installed on the door 90, the outer assembly 110 is mounted on the door outer side 92, the center assembly 120 is seated in the cross-bore 96, and the inner assembly 130 is mounted on the door inner side 93. As described in further detail below, the status-indicating assembly 300 may enable the status-indicating locking assembly 100 to be installed on the door 90 without requiring modification of the door 90. In other words, the status-indicating locking assembly 100 may be installed on the door 90 without requiring additional cutouts to be added to the standard cylindrical door preparation 95. As such, the door 90 may be a commercially available door, and the cross-bore 96 and edge bore 98 may be of standard dimensions.

The outer assembly 110 includes an outer actuator or handle 112, an outer lock cylinder 114 positioned in the handle 112, an outer rose 116, an outer handle spindle 117 extending through the rose 116, and an outer spring cage 118 positioned in the rose 116. When assembled, the spindle 117 is rotatably mounted on the spring cage 118, the handle 112 is mounted on the spindle 117, and the rose 116 abuts the door 90 to prevent tampering with the internal components of the lockset 101. The lock cylinder 114 includes an outer tailpiece 115, and is configured to selectively permit rotation of the tailpiece 115, for example upon insertion of a proper key. The spring cage 118 includes a biasing element which urges the spindle 117 to a home position, thereby biasing the handle 112 to a corresponding home position. While other forms are contemplated, in the illustrated embodiment, the lever of the outer handle 112 is substantially horizontal when the handle 112 is in the home position.

The center assembly 120 extends through the cross-bore 96, and connects the outer assembly 110 to the inner assembly 130. The center assembly 120 includes a latchbolt assembly 121 including a latchbolt 122 and a housing 124, a mounting plate 128, and a chassis 200 which selectively couples the outer handle 112 to the latchbolt 122. During installation, the latchbolt assembly 121 is inserted into the edge bore 98, and the chassis 200 is inserted into the cross-bore 96 from the door outer side 92 and engages the latchbolt assembly 121, and the mounting plate 128 is attached to the chassis 200 from the door inner side 93.

The inner assembly 130 is substantially similar to the outer assembly 110, and includes an inner actuator or handle 132, an inner lock cylinder 134 including an inner tailpiece 135, an inner rose 136, and an inner spring cage 138, each of which is substantially similar to the respective elements described above with respect to the outer assembly 110. As will be described in further detail below, while the outer handle 112 is selectively operable to retract the latchbolt 122, the inner handle 132 may be continuously operable to retract the latchbolt 122.

While the illustrated status-indicating locking assembly 100 includes exemplary features as described above, it is also contemplated that additional or alternative features may be included. For example, while the illustrated handles 112, 132 are of the lever type, it is also contemplated that one or more of the handles 112, 132 may include a different type of actuator, such as a knob. Additionally, while the exemplary lock cylinders 114, 134 are of the key-in-lever variety, it is also contemplated that that one or more of the cylinders 114, 134 may be of another format, such as small format interchangeable core (SFIC).

In certain forms, the cylinders 114, 134 may each be operable by an identical set of key cuts. In other forms, the outer cylinder 114 may be operable by a first set of key cuts, and the inner cylinder 134 may be operable by a second set of key cuts, which may include the first set of key cuts. Furthermore, while the illustrated outer and inner assemblies 110, 130 are substantially similar, it is also contemplated that one may include features or elements which are not present in the other. For example, in certain forms, the inner assembly 130 may not necessarily include the inner lock cylinder 134, and may instead include another form of lock actuating device, such as a push button.

The chassis 200 includes an outer chassis assembly 210, a retractor assembly 220, and an inner chassis assembly 230. The chassis 200 is configured to selectively couple the outer handle 112 to the latchbolt 122, and may further be configured to continuously couple the inner handle 132 to the latchbolt 122. As described in further detail below, the outer chassis assembly 210 includes a first drive tube in the form of an outer key cam shell 242, and the inner chassis assembly 230 includes a second drive tube in the form of an inner spindle 234. The retractor assembly 220 is positioned between the drive tubes 234, 242, and is configured to move transversely in response to each of rotation of the inner spindle 234 and rotation of the outer key cam shell 242.

The outer chassis assembly 210 includes an adjustment plate 211, an outer hub 212, an outer spindle 214, and an outer key cam 240. The outer spindle 214 is seated in the hub 212, and is operably coupled with the outer assembly 110 such that rotation of the outer handle 112 causes the spindle 214 to rotate. The outer key cam 240 includes the first drive tube or outer key cam shell 242, which includes a pair of arms 243 operable to actuate the retractor assembly 220. The outer key cam 240 also includes a locking lug 246 operable to selectively couple the outer key cam shell 242 with the outer spindle 214.

The retractor assembly 220 includes a retractor 222, and may further include biasing members or springs 224 which are retained in the retractor 222 by a clip 226. The retractor 222 includes a first pair of cam surfaces 223 on a proximal side of the retractor 222 and a second pair of cam surfaces 223 on a distal side of the retractor 222. The proximal cam surfaces 223 are engageable by the arms 243 of the outer drive tube 244, such that rotation of outer drive tube 244 causes lateral motion of the retractor 222. The distal cam surfaces 223 are engageable by the arms 235 of the inner drive tube 234, such that rotation of the inner drive tube 234 causes lateral motion of the retractor 222. The retractor assembly 220 is operably coupled to the latchbolt assembly 121 such that lateral motion of the retractor 222 causes the latchbolt 122 to extend or retract.

Figure 4:
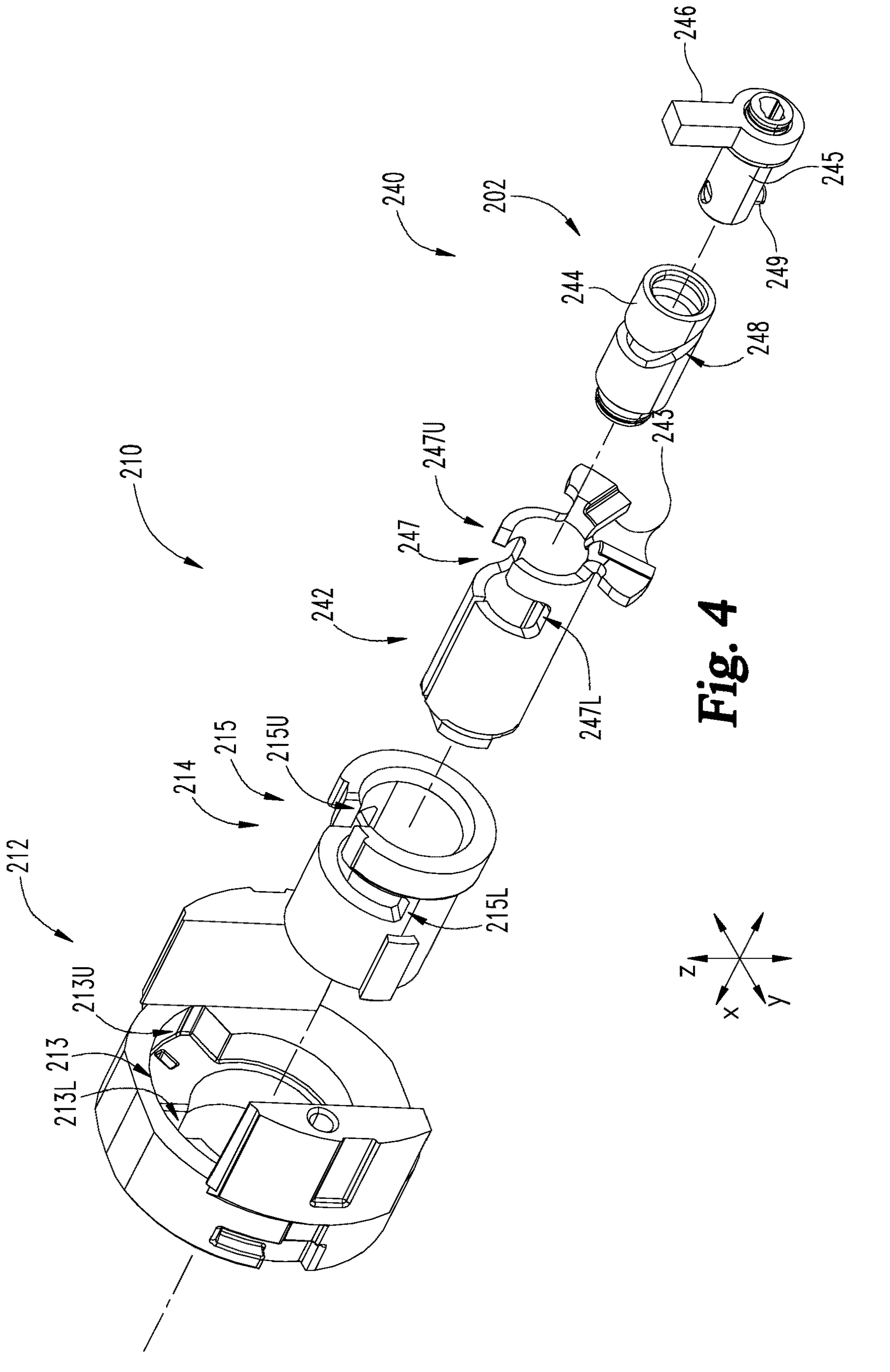
FIG. 4 is an exploded assembly view of a portion of the chassis illustrated in FIG. 3.

With additional reference to FIGS. 4 and 5, the outer key cam 240 includes the outer key cam shell 242, an outer key cam plug 244 rotatably mounted in the shell 242, an outer key cam stem 245 slidably mounted in the plug 244, and the locking lug 246, which is mounted on the stem 245. The plug 244 is engaged with the outer tailpiece 115 such that rotation of the outer tailpiece 115 rotates the plug 244. The plug 244 includes a helical channel 248, and the stem 245 includes a pin 249 which extends into the helical channel 248. When the plug 244 is rotated, the edges of the helical channel 248 engage the pin 249 and longitudinally urges the stem 245 in a direction corresponding to the direction in which the plug 244 is rotated. As such, rotation of the plug 248 causes longitudinal movement of the locking lug 246.

The plug 244, stem 245, lug 246, and pin 249 define a portion of a lock control assembly 202. As described in further detail below, the lock control assembly 202 has a locking state in which the outer handle 112 is not operable to retract the latchbolt 122, and an unlocking state in which the outer handle 112 is operable to retract the latchbolt 122. Additionally, each element of the lock control assembly 202 has a locking position when the lock control assembly 202 is in the locking state, and has an unlocking position when the lock control assembly 202 is in the unlocking state.

In the illustrated form, the locking lug 246 extends into a recess 213 in the outer hub 212 through an opening 247 in the shell 242 and an opening 215 in the outer spindle 214. Each of the recess 213, shell opening 247, and spindle opening 215 includes a locking section (designated with the suffix "L") and an unlocking section (designated with the suffix "U"). For example, the recess 213 includes a locking section 213L in the form of an axial channel which extends in the longitudinal direction, and an unlocking section 213U defined in part by a sector of a circle which extends along a plane transverse to the longitudinal direction.

The shell opening 247 includes a longitudinal unlocking section 247U and a locking section 247L which extends about a portion of the circumference of the shell 242. In the illustrated form, the spindle opening 215 is substantially similar to the shell opening 247, and includes a longitudinal unlocking section 215U and a locking section 215L which extends about a portion of the circumference of the spindle 214. As described in further detail below, it is also contemplated that the locking section 215L of the spindle opening 215 may instead be a longitudinal extension of the longitudinal unlocking section 215U.

Figure 5A:
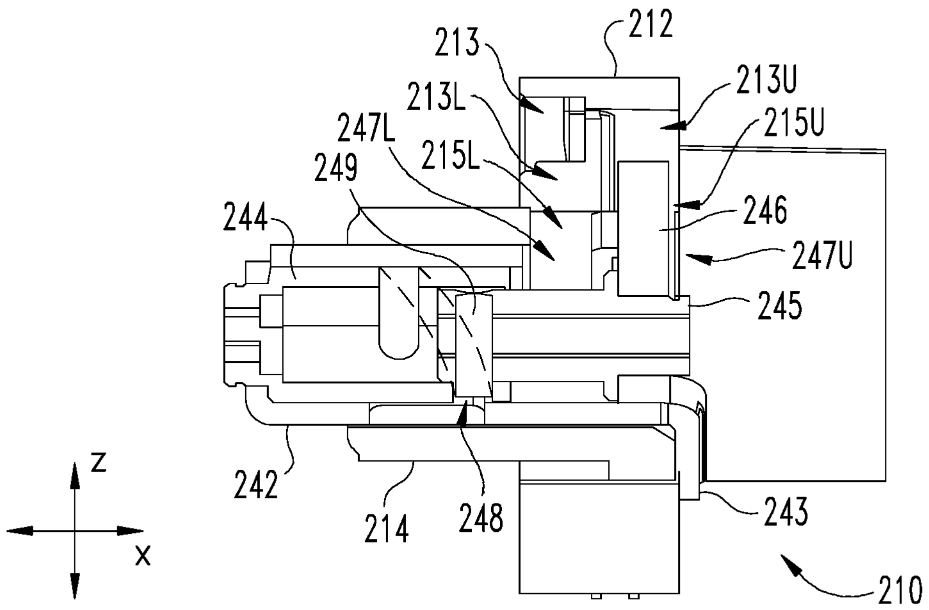
FIGS. 5*a* and 5*b* are partial cross-sectional illustrations of the chassis portion illustrated in FIG. 4 in a locked state and an unlocked state, respectively.

FIG. 5*a* illustrates the outer chassis subassembly 210 with the lock control assembly 202 in an unlocking state and the lug 246 in a corresponding unlocking position. In this state, the lug 246 extends into the unlocking section 213U of the recess 213 through the unlocking sections 215U, 247U of the spindle opening 215 and the shell opening 247. With the lug 246 received in the longitudinal unlocking sections 215U, 247U, the spindle 214 and the shell 242 are rotationally coupled to one another. Additionally, with the lug 246 received in the transverse unlocking section 213U of the recess 213, the spindle 214 and outer key cam shell 242 are free to rotate with respect to the hub 212. As such, the outer handle 112 is operable to rotate the first drive tube 242 to retract the latchbolt 122.

Figure 5B:
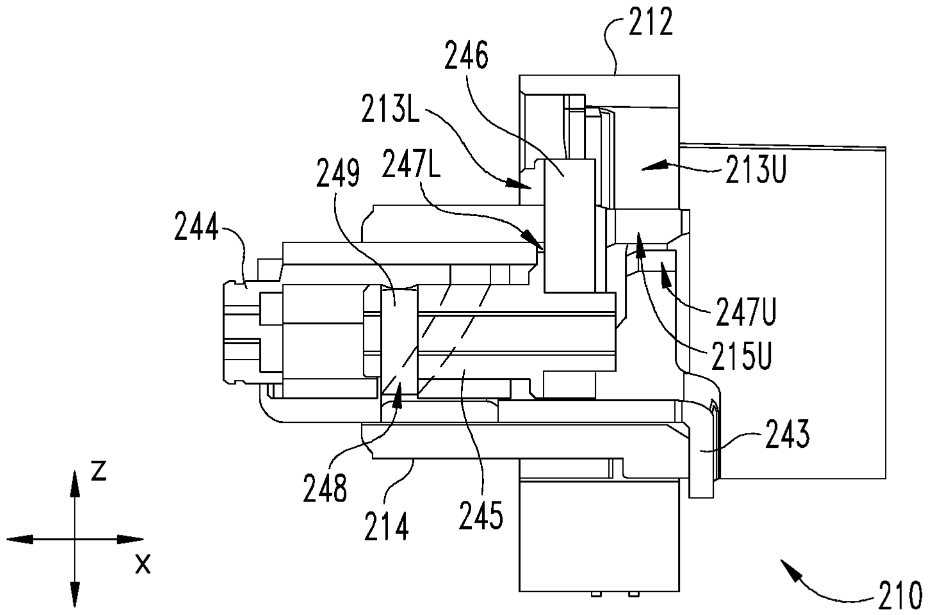

FIG. 5*b* illustrates the outer chassis subassembly 210 with the lock control assembly 202 in a locking state and the lug 246 in a corresponding locking position. In this state, the lug 246 extends into the locking section 213L of the recess 213 through the locking sections 215L, 247L of the spindle opening 215 and the shell opening 247. With the lug 246 received in the longitudinal locking section 213L of the hub recess 213, the lug 246 is rotationally coupled to the hub 212. Additionally, with the lug 246 extending through the transverse locking sections 215L, 247L of the spindle opening 215 and the shell opening 247, the spindle 214 and the shell 242 are rotationally decoupled. Accordingly, rotation of the outer handle 212 will rotate the spindle 214, but such rotation will not be transmitted to the first drive tube 242. The outer handle 112 is therefore free to rotate without retracting the latchbolt 122.

In the illustrated form, the locking section 215L of the spindle opening 215 allows the outer handle 112 to freewheel when the lock control assembly 202 is in the locking state. As noted above, it is also contemplated that the locking section 215L of the spindle opening 215 may be provided as a longitudinal extension of the longitudinal unlocking section 215U. In such forms, the locking lug 246 extends into the longitudinal locking section 213L of the recess 213 through the longitudinal locking section 215L of the spindle opening 215 when in the locking position, thereby rotationally coupling the hub 212 and the spindle 214. As such, the outer handle 112 is unable to rotate when the lock control assembly 202 is in the locking state.

The inner chassis assembly 230 includes an inner hub 232, a second drive tube or inner spindle 234 rotatably mounted in the hub 232, a drive bar 236, a sleeve 238, and an inner key cam 250. Like the first drive tube or outer key cam plug 242, the second drive tube or inner spindle 234 includes arms 235 which, when the spindle 234 is rotated, engage one of the cam surfaces 223 to move the retractor 222 and retract the latchbolt 122. The inner spindle 234 is rotationally coupled to the inner handle 132, such that the inner handle 132 is operable to retract the latchbolt 122.

The inner key cam 250 operably connects the inner tailpiece 135 to the drive bar 236, and includes an inner key cam shell 252, an inner key cam stem 254 that is rotatable with respect to the shell 252 and rotationally coupled with the drive bar 236, and a post 256 extending from the stem 254 into a transverse channel 258 formed in the shell 252. Rotation of the tailpiece 135 through a predetermined angle causes rotation of the inner key cam stem 254, which in turn rotates the drive bar 236. The outer key cam stem 245 is slidingly and rotationally coupled to the drive bar 236, such that the stem 245 is free to travel axially along the drive bar 236 as the stem 245 moves between the locked and unlocked positions.

The drive bar 236, the outer key cam stem 245, the locking lug 246, and the inner key cam stem 254 are operably coupled with one another in the lock control assembly 202. When the lock control assembly 202 is in the locking state, each element thereof is in a corresponding locking position. Conversely, when the lock control assembly 202 is in the unlocking state, each element thereof is in a corresponding unlocking position. In other words, when the locking lug 246 is in the locking position or the unlocking position, each element of the lock control assembly 202 is in the corresponding locking or unlocking position, and the lock control assembly 202 is in the corresponding locking or unlocking state. Thus, each of the lock cylinders 114, 134 is independently operable to set the lock control assembly 202 to the locking or unlocking state.

When the lock control assembly 202 is in the unlocking state, the locking lug 246 is in the unlocking position, and the outer handle 112 is operably coupled to the retractor assembly 220. In this state, rotation of the outer handle 112 rotates the first or outer drive tube 244. As the drive tube 244 rotates, one of the arms 243 engages one of the cam surfaces 223, causing lateral motion of the retractor 222 and retraction of the latchbolt 122. Thus, when the lock control assembly 202 is in the unlocking state, the lockset 101 is in an unlocked state, and the outer handle 112 is operable to retract the latchbolt 122.

When the lock control assembly 202 is in the locking state, the locking lug 246 is in the locking position, and the outer handle 112 is not operably coupled to the retractor assembly 220. In this state, the outer handle 112 is not operably connected to the outer drive tube 244, and is thus unable to retract the latchbolt 122. In the illustrated embodiment, the inner handle 132 remains operably coupled to the retractor assembly 220 in both the unlocked and locked states of the locking assembly 100. That is to say, the inner handle 132 is operable to retract the latchbolt 122 regardless of the state of the lock control assembly 202. As such, a user inside the room can open the door 90 for emergency egress, even when the locking assembly 100 is locked.

As previously noted, various features of cylindrical locksets such as the illustrated lockset 101 present obstacles which have hindered the creation of a viable status indicator for such assemblies. For example, it is desirable that the chassis 200 be mountable in a standard cross-bore 96 without requiring additional drilling or other modification of the door 90. Additionally, the spring cages 118, 138 may abut the door 90, effectively sealing the cross-bore 96 from the visible portions of the locking assembly 100. In other words, the spring cages 118, 138 obstruct the path between the location where the status of the lockset 101 can be sensed and the roses 116, 136, where the lock status is typically displayed.

As illustrated in FIG. 1, the status-indicating assembly 300 includes a sensor 310, a transmission 320 coupled to the sensor 310, and an indicator 330 coupled to the transmission 320. As described in further detail below, during operation of the status-indicating assembly 300, the sensor 310 senses the status of the lockset 101, the transmission 320 communicates the status to the indicator 330, and the indicator 330 displays an indicium relating to the status of the lockset 101.

The sensor 310 is associated with a movable element 302 of the cylindrical lockset 101, and is configured to sense the status of the lockset 101 based upon the position of the movable element 302. By way of non-limiting example, the movable element 302 may be an element of the lock control assembly 202, such as the locking lug 246. As described in further detail below, the sensor 310 includes a slider which is selectively actuated by the movable element 302. The movable element 302 has an actuating position in which it actuates the slider of the sensor 310, thereby setting the sensor 310 to an actuated sensor state. The movable element 302 also has a deactuating position in which it does not actuate the slider of the sensor 310, thereby setting the sensor 310 to a non-actuated or non-actuated sensor state. As described in further detail below, the movable element 302 has one of the actuating position and the deactuating position when the lock control assembly 202 is in the locking state, and has the other of the actuating position and the deactuating position when the lock control assembly 202 is in the unlocking state.

The transmission 320 is configured to transmit the status of the lockset 101 from the sensor 310 to the indicator 330. The transmission 320 may be directly associated with the sensor 310 and/or the indicator 330, or may be connected to one or more of the sensor 310 and the indicator 330 through one or more intermediate elements. The transmission 320 may further be configured to control the indicator 330 such that the indicator 330 displays the indicium corresponding to the state of the sensor 310.

The indicator 330 is mounted on the cylindrical lockset 101 such that at least a portion of the indicator 330 is visible from at least one side of the door 90. In the illustrated embodiment, the indicator 330 is mounted on the door inner side 93, such that the indicator 330 is visible from inside the room when the door 90 is closed. It is also contemplated that the indicator 330 may be mounted on the door outer side 92, such that the indicator 330 is visible from outside the room when the door 90 is closed. For example, when the locking assembly 100 is installed primarily for security purposes, the indicator 330 may be mounted on the door inner side 93. When the locking assembly 100 is installed primarily for privacy purposes (such as in a restroom or changing room), the indicator 330 may be mounted on the door outer side 92 to indicate whether the room is occupied or vacant.

Furthermore, while the illustrated indicator 330 is visible through an opening in the inner rose 136, it is also contemplated that the indicator 330 may be mounted on the inner rose 136. In further embodiments, the indicator 330 may be positioned elsewhere, such as on or in the outer rose 116 or one of the handles 112, 132. Additionally, while the exemplary form of status-indicating assembly 300 includes a single indicator 330, it is also contemplated that a plurality of indicators 330 may be employed, and that two of the indicators may be visible from the same or opposite sides of the door 90.

The exemplary indicator 330 has an actuated indicator state and a non-actuated indicator state. The indicator 330 is connected to the sensor 310 through the transmission 320 such that the actuated/non-actuated state of the indicator 330 corresponds to the actuated/non-actuated state of the sensor 310. The indicator 330 is configured to display an actuated indicium when in the actuated indicator state and to display a non-actuated indicium when in the non-actuated indicator state. For example, when the actuating position of the movable element 302 corresponds to the locking state of the lock control assembly 202, the actuated indicium may be a locked indicium and the non-actuated indicium may be an unlocked indicium. Conversely, when the actuating position of the movable element 302 corresponds to the unlocking state of the lock control assembly 202, the actuated indicium may be an unlocked indicium and the non-actuated indicium may be a locked indicium.

One or more of the indicia may include, for example, a color, an icon, a word, or another form of indicium which a user can readily interpret to determine the status of the locking assembly 100. The indicator 330 may further be configured to display one or more of the indicia such that the indicium is visible from at least a predetermined distance and throughout a predetermined viewing angle. For example, the indicator 330 may display the indicia such that the displayed indicium is visible from a distance of at least 20 feet across a 180° viewing angle.

In certain embodiments, the status-indicating assembly 300 may be a mechanical status-indicating assembly including a mechanical sensor 310, transmission 320, and indicator 330. For example, the indicator 330 may be provided in the form of an indicator plate which is movably mounted behind a window through which the displayed indicium is visible. In such forms, the transmission 320 may be provided as a mechanical linkage connecting the slider of the sensor 310 to the movable indicator plate 330. An example of such an embodiment is described below with reference to FIGS. 14-18.

In other embodiments, the status-indicating assembly 300 may include one or more electronic elements. For example, the sensor 310 may further include a switch or electronic sensing device which is actuated by the movement of the slider, and the transmission 320 may include one or more wires connected with the switch or electronic sensing device. In such forms, the indicator 330 may include a primarily electronic display, such as one or more light emitting diodes (LEDs), a liquid crystal display (LCD), an electronic paper display (EPD), or an incandescent, fluorescent, or electroluminescent display. The indicator 330 may further include a controller or electrical circuit configured to control operation of the indicator 330 based upon information received from the transmission 320.

By way of illustration, an electronic component of the indicator 330 may include an LED or another light-producing element configured to display the indicia in response to commands from a controller. One of the indicia may include the on state of the LED, and the other of the indicia may include the off state of the LED. For example, the LED may periodically blink or flash when the locking assembly 100 is in the locked state, and remain off when the locking assembly 100 is in the unlocked state. The indicator 330 may further include a transparent or translucent window, which may have a lock icon stenciled or molded into it. In such a case, the lock icon may be visible when the LED is in the on state, and less visible or not visible when the LED is in the off state. The window may protrude from the element on which it is mounted in order to increase the angle across which the displayed indicium can be viewed.

In certain forms, the LED or other light producing element may be directly visible. For example, the LED may be mounted in an opening formed in one of the roses 116, 136. In other forms, the LED may be mounted on an internal component of the locking assembly 100, and a light pipe may be utilized to transmit the light from the LED to a visible location. For example, the LED may be mounted on a printed circuit board (PCB), and a fiber-optic cable may transmit the light to a visible location on one of the roses 116, 136. The light pipe may include a dome-shaped end protruding from the rose 116, 136, in order to increase the angle across which the indicium can be viewed.

While the above-described forms of the status-indicating assembly 300 entirely or primarily utilize a single operating principle, in certain forms, the elements of the status-indicating assembly 300 may utilize varied operating principles. That is to say, additional embodiments may combine a sensor 310, transmission 320, and indicator 330 from the mechanical and electronic embodiments described above. For example, an electronic form of the sensor 310 may be coupled to electrical wires included in the transmission 320. The transmission 320 may further include an electrical circuit connected to a motor operable to move a mechanical form of the indicator 330 between the actuated and non-actuated positions.

Furthermore, the status-indicating assembly 300 may be a passive status-indicating assembly operable to display the appropriate indicium without being acted upon by a user. In such forms, the user can readily determine the status of the lockset 101 merely by looking at the indicator 330 without having to approach the door 90.

Figure 6A:
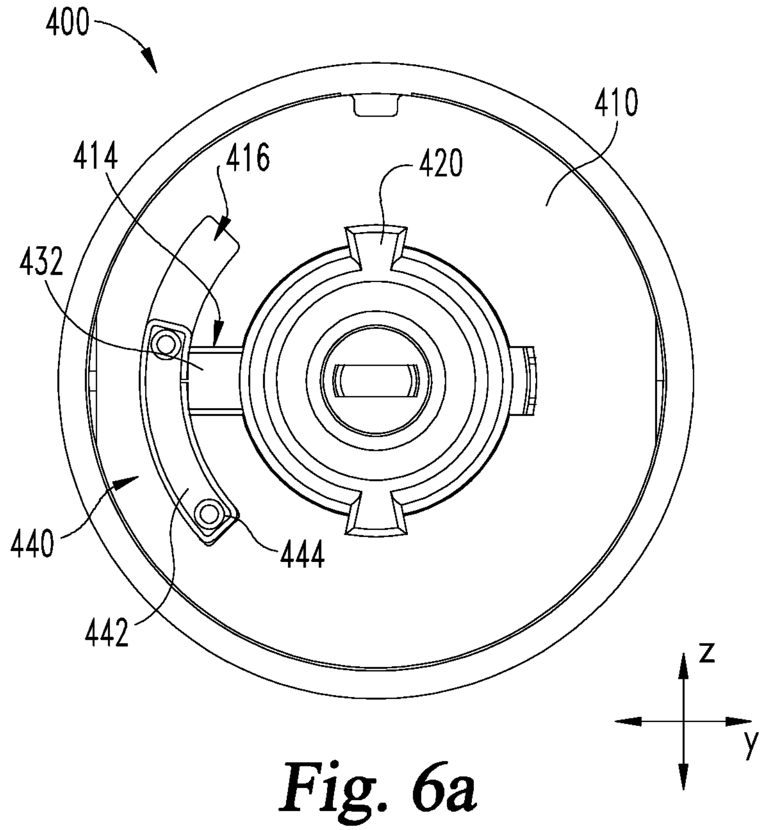
FIGS. 6*a* and 6*b* illustrate a chassis subassembly according to one embodiment in a non-actuated state.

With reference to FIGS. 6 and 7, illustrated therein is a chassis subassembly 400 according to one embodiment. The subassembly 400 includes a hub 410, a spindle 420 rotatably mounted in the hub 410, a movable element 430 movably mounted in the spindle 420, and a sensor 440 associated with the movable element 430. As described in further detail below, the subassembly 400 may be implemented as a subassembly of a chassis such as the above-described chassis 200. For example, the illustrated subassembly 400 corresponds to the outer chassis assembly 210, and the hub 410, spindle 420, movable element 430, and sensor assembly 440 correspond to the hub 212, spindle 214, locking lug 246, and sensor 310 respectively.

The hub 410 includes an angular recess 412, a longitudinal channel 414, and an arcuate guide channel 416. The angular recess 412 intersects the longitudinal channel 414 at an intersection 413, and the longitudinal channel 414 intersects the arcuate guide channel 416 at an intersection 415. The longitudinal channel 414 extends in the longitudinal direction, and each of the angular recess 412 and the arcuate guide channel 416 extends along a plane which is transverse to the longitudinal direction.

The movable element 430 is movably seated in the spindle 420, and includes an arm 432 which extends radially outward through an opening in the spindle 420 and into the hub 410. The arm 432 may include one or more chamfers 434 facing the sensor 440. The movable element 430 has a deactuating first position (FIG. 6) and an actuating second position (FIG. 7). The movable element 430 may be provided as a portion of the above-described lock control assembly 202, such that the first position corresponds to a first state of the lock control assembly 202 and the second position corresponds to a second state of the lock control assembly 202. In the illustrated form, the movable element 430 corresponds to the locking lug 246, the deactuating position corresponds to the unlocking position, and the actuating position corresponds to the locking position. In other forms, the movable element 430 may correspond to another element of the lock control assembly 202, the deactuating position may correspond to a locking position, and the actuating position may correspond to an unlocking position.

In the illustrated form, the sensor assembly 440 includes a single slider 442 movably seated in the guide channel 416. The slider 442 has an arcuate geometry corresponding to that of the arcuate guide channel 416, and is free to travel along the path defined by the guide channel 416. The longitudinally inward side of the slider 442 includes at least one ramp 443 facing the movable element 430, and the longitudinally outward side of the slider 442 may include one or more attachment points 444. As described in further detail below, the attachment points 444 may be used to couple the slider 442 to a transmission, such as the transmission 320 of the status-indicating assembly 300.

The sensor 440 has a non-actuated or first sensor state (FIG. 6), in which the slider 442 is a non-actuated or first slider position. The sensor 440 also has an actuated or second sensor state (FIG. 7), in which the slider 442 is in an actuated or second slider position. The slider 442 may be biased to the first slider position, for example by gravity, a biasing member, or a transmission. The sensor 440 is coupled to the indicator 330 via the transmission 320 such that the state of the indicator 330 corresponds to the state of the sensor 440. More specifically, the indicator 330 has a non-actuated or first indicator state in response to the non-actuated or first sensor state, and has an actuated or second indicator state in response the actuated or second sensor state.

Figure 6B:
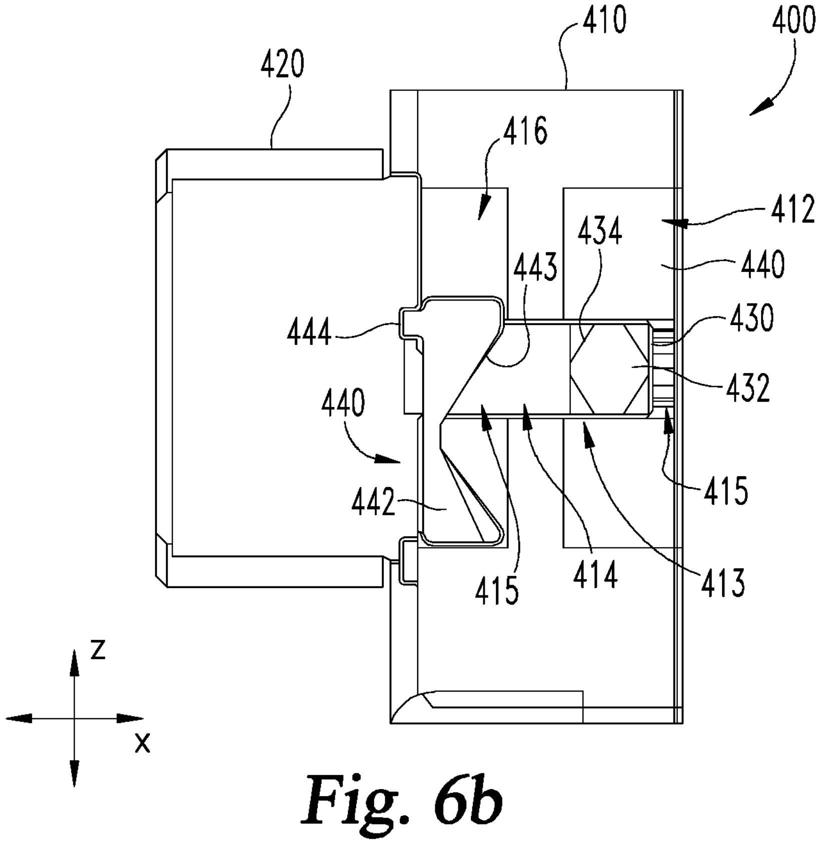
Figure 7A:
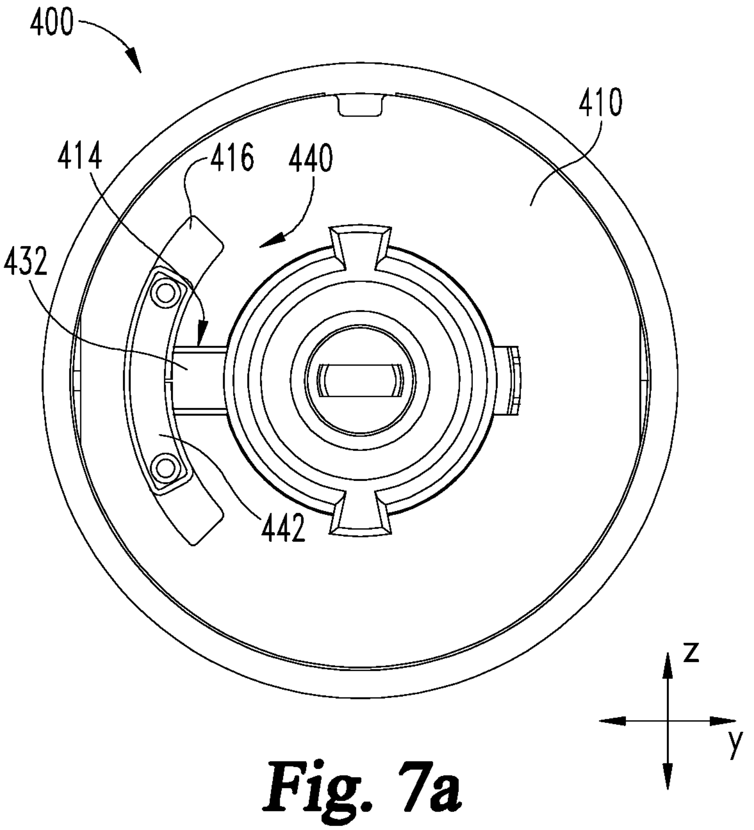
FIGS. 7*a* and 7*b* illustrate the chassis subassembly illustrated in FIGS. 6*a* and 6*b* in an actuated state.
Figure 7B:
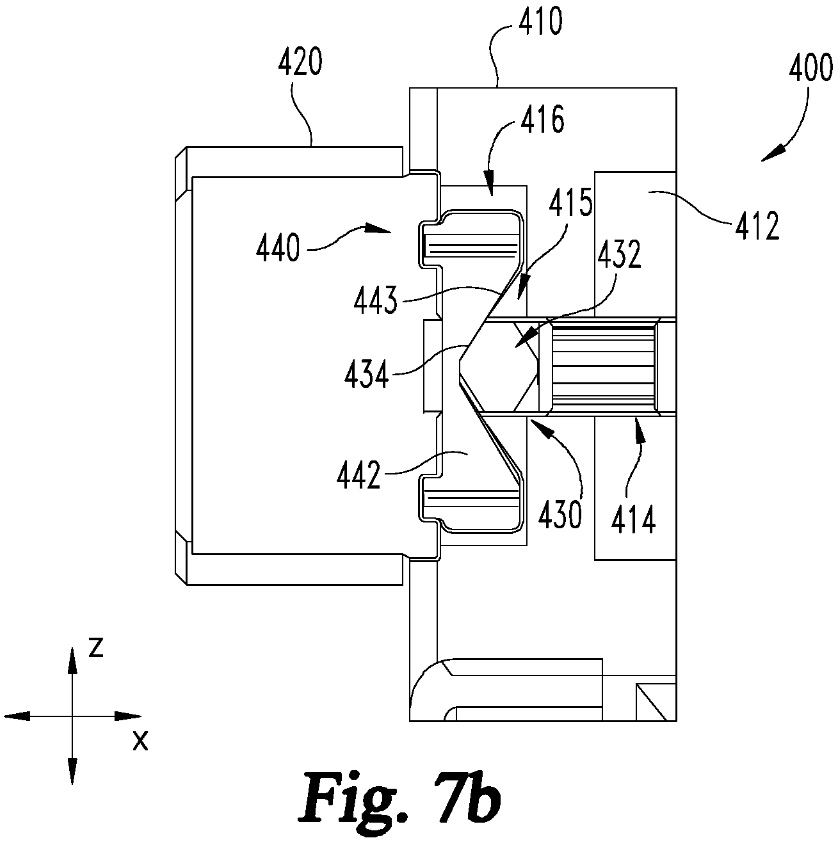

FIG. 6 illustrates the subassembly 400 with the movable element 430 and slider 442 in the respective first positions. In this state, one of the ramps 443 is aligned with the axial channel 414 and positioned in the intersection 415. When the lock control assembly 202 transitions states, the movable element 430 moves from the deactuating first position (FIG. 6*b*) to the actuating second position (FIG. 7*b*). As the movable element 430 moves to the actuating position, the arm 432 enters the intersection 415 and engages the slider 442. More specifically, the chamfer 434 engages the ramp 443, thereby urging the slider 442 to the actuating position. In other words, movement of the movable element 430 from the deactuating position to the actuating position causes a corresponding movement of the slider 442 from the non-actuated position to the actuated position. As such, the actuated/non-actuated state of the sensor 440 corresponds to the locked/unlocked state of the lock control assembly 202.

The illustrated slider 442 is a unitary structure which includes two of the ramps 443 and two of the attachment points 444. Additionally, the longitudinally outward side of the arm 432 of the movable element 430 includes two chamfers 434 corresponding to the two ramps 443. As such, the subassembly 400 is non-handed, and can be installed in either of two orientations. For example, the subassembly 400 may be rotated 180° with respect to the orientation illustrated in FIGS. 6*a* and 7*a* without affecting the operation of the subassembly 400.

In the illustrated form, the subassembly 400 is provided at the outer chassis assembly 210, the hub 410 corresponds to the outer hub 212, the drive tube 420 corresponds to the outer spindle 214, and the movable element 430 corresponds to the locking lug 246. In this embodiment, when the lock control assembly 202 is in the unlocked state, the movable element 430 is in the deactuating position, and the sensor 440 is in the non-actuated state. When the lock control assembly 202 is moved to the locked state, the movable element 430 travels to the actuating position, thereby transitioning the sensor 440 to the actuated state.

In other embodiments, the subassembly 400 may be provided at the inner chassis assembly 230, such that the hub 410 corresponds to the inner hub 232, the drive tube 420 corresponds to the second drive tube or inner spindle 234, and the movable element 430 corresponds to a plunger, such as the plunger 630 described below with reference to FIGS. 12 and 13. In such embodiments, when the lock control assembly 202 is in the locked state, the movable element 430 may be in the deactuating position, thereby setting the sensor 440 in the non-actuated state. When the lock control assembly 202 is moved to the unlocked state, the movable element 430 may travel to the actuating position, thereby transitioning the sensor 440 to the actuated state.

FIGS. 8-11 illustrate a chassis subassembly 500 according to another embodiment. The chassis subassembly 500 is substantially similar to the chassis subassembly 400 described above. Unless indicated otherwise, similar reference characters are used to denote similar elements and features. For example, the subassembly 500 includes a hub 510, a drive tube 520, a movable element 530, and a sensor 540. In the interest of conciseness, the following description focuses primarily on features of the subassembly 500 which are different from those described above with reference to the subassembly 400.

The hub 510 includes an axial channel 514 extending in the longitudinal direction and a guide channel 516 extending along a plane transverse to the longitudinal direction (i.e., the Z-Y plane). The guide channel 516 includes at least one section 518 configured to receive at least a portion of the sensor 540. More specifically, each of the sections 518 is sized and configured to receive a slider 542 of the sensor 540, and extends along the transverse plane at an oblique angle with respect to the lateral (Y) and transverse (Z) directions.

Each of the sliders 542 is movably seated in a corresponding one of the sections 518 of the guide channel 516. The guide channel 516 and sliders 542 may include features which discourage the sliders 542 from being inserted into the guide channel 516 in an improper orientation. For example, one side of the guide channel 516 may include a shoulder 517, and the corresponding side of the slider 542 may include an undercut 547 structured to receive the shoulder 517. Each of the sliders 542 includes an attachment point in the form of an opening 544 which extends through a boss 545. As described in further detail below, the opening 544 is configured to receive a post to couple the slider 542 to the transmission 320. A slider 542 which is attached to the transmission 320 may be referred to as an active slider, and a slider 542 which is not attached to the transmission 320 may be referred to as an inactive slider. In certain forms, only one of the sliders 542 may be active, and the other of the sliders 542 may be inactive or omitted. In other forms, both sliders 542 may be active. For example, one of the sliders may be connected to a mechanical transmission such as a linkage, and the other of the sliders may be associated with a switch. In such forms, the switch may be connected to an electronic transmission such as a wire.

Figure 8:
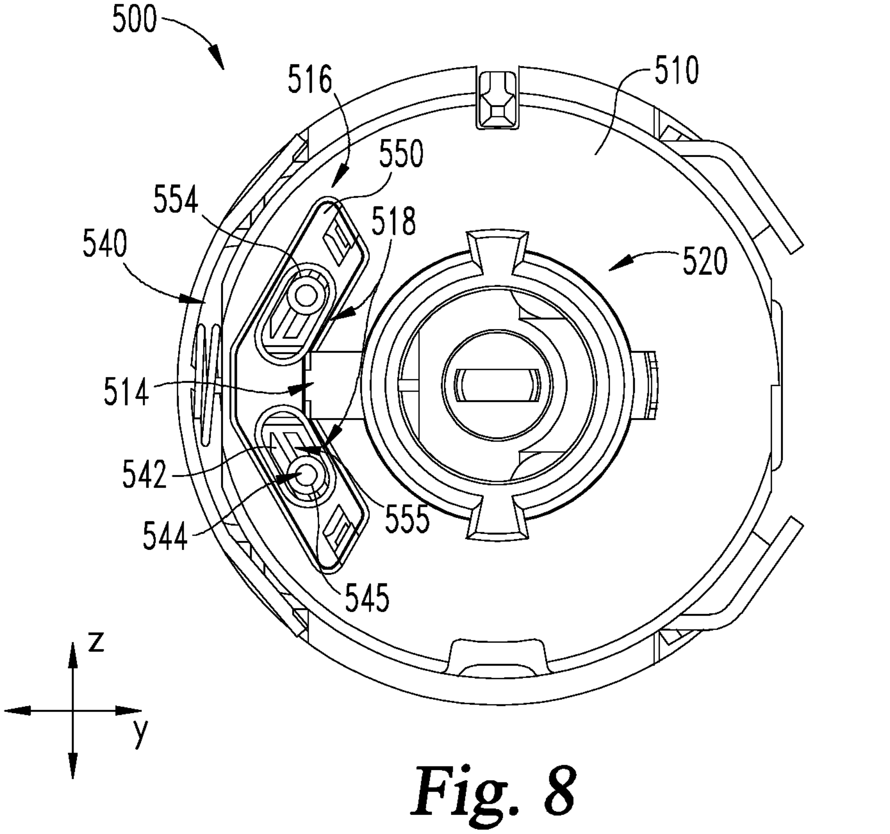
FIG. 8 is a plan view of a chassis subassembly according to another embodiment.
Figure 9:
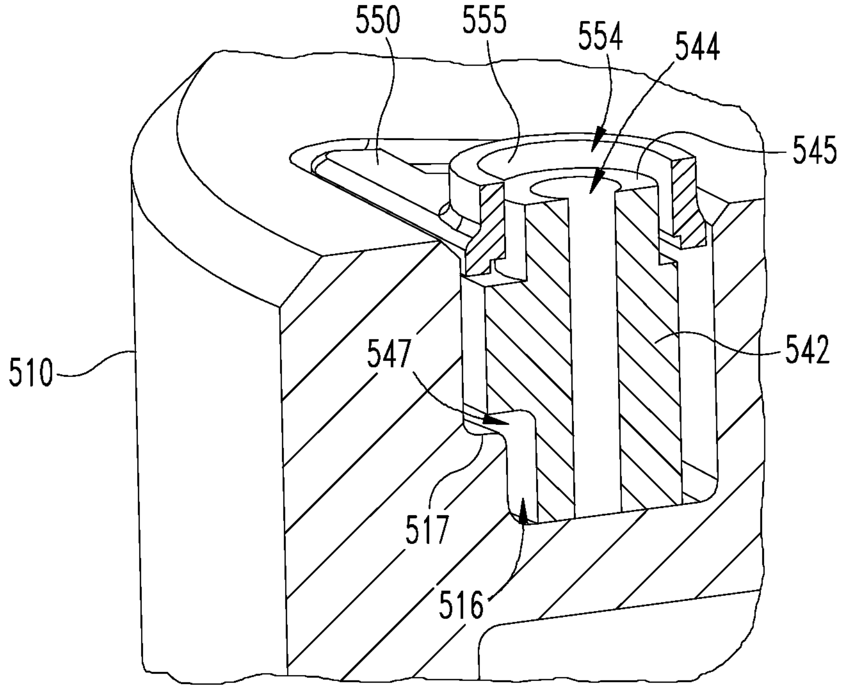
FIG. 9 is a partial cross-sectional illustration of a portion of the subassembly illustrated in FIG. 8.

The subassembly 500 may further include a retainer 550 (FIGS. 8 and 9). The retainer 550 is coupled to the hub 510 and retains the sliders 542 in the guide channel 516. The retainer 550 may include walls 554 defining slots 555. The bosses 545 may extend longitudinally into the slots 555 such that the slots 555 slidably receive the bosses 545.

Figure 10A:
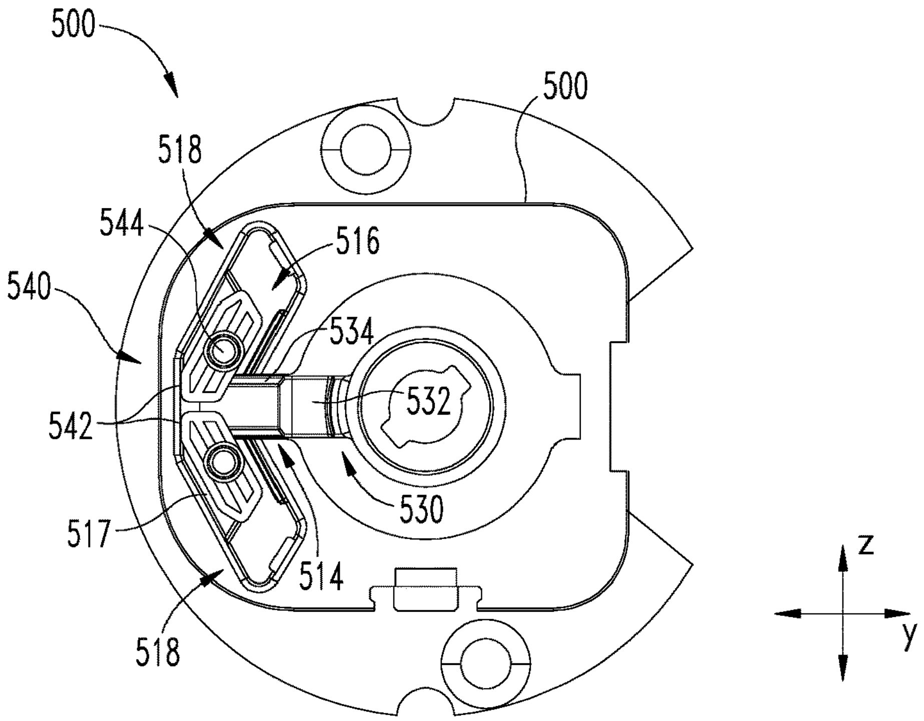
FIGS. 10*a* and 10*b* illustrate the chassis subassembly of FIG. 8 in a non-actuated state.
Figure 10B:
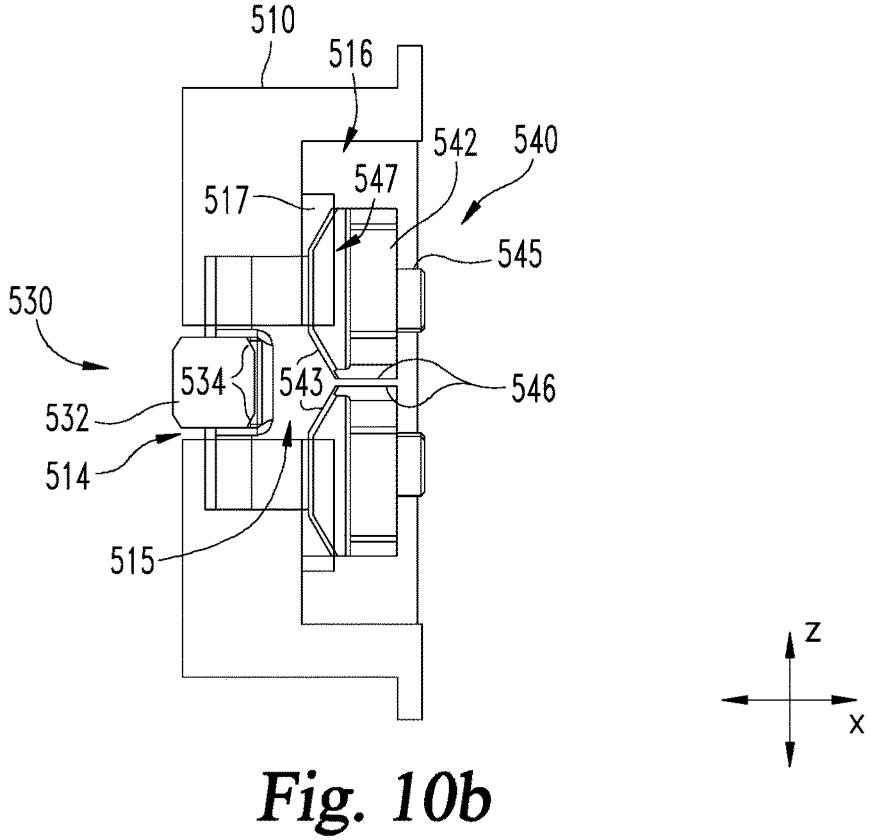

FIGS. 10*a* and 10*b* illustrate the subassembly 500 with the movable element 530 in the deactuating position and the sensor 540 in the non-actuated state. In this arrangement, at least the active slider 542 is in the non-actuated slider position, in which the slider 542 extends into the intersection 515 and the ramp 543 is aligned with the arm 532 of the movable element 530. When the lock control assembly 202 transitions states, the movable element 530 travels from the deactuating position to the actuating position.

Figure 11A:
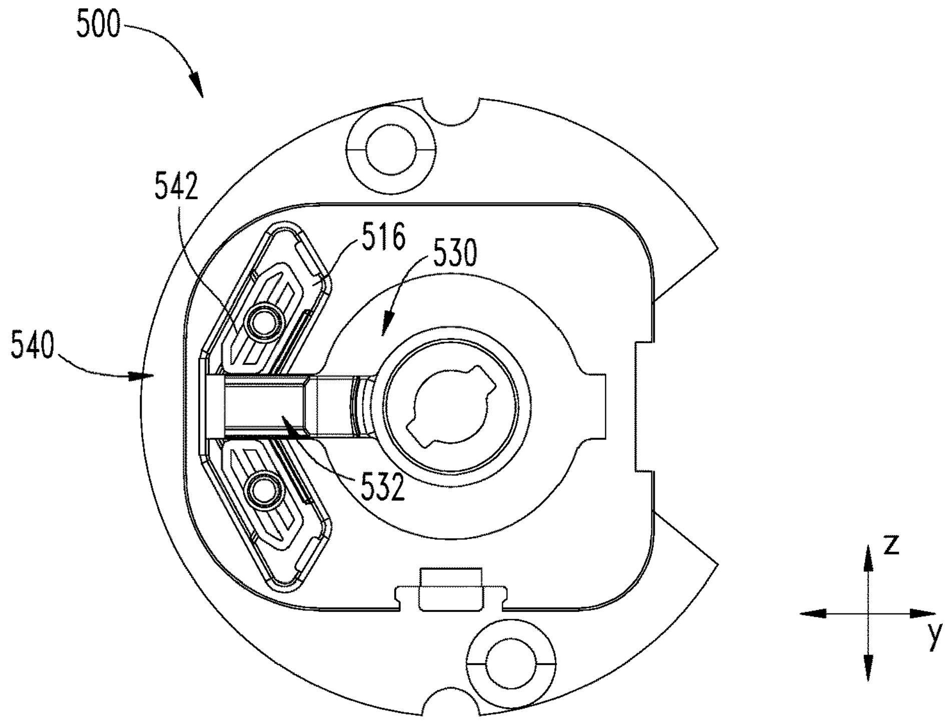
FIGS. 11*a* and 11*b* illustrate the chassis subassembly of FIG. 8 in an actuated state.
Figure 11B:
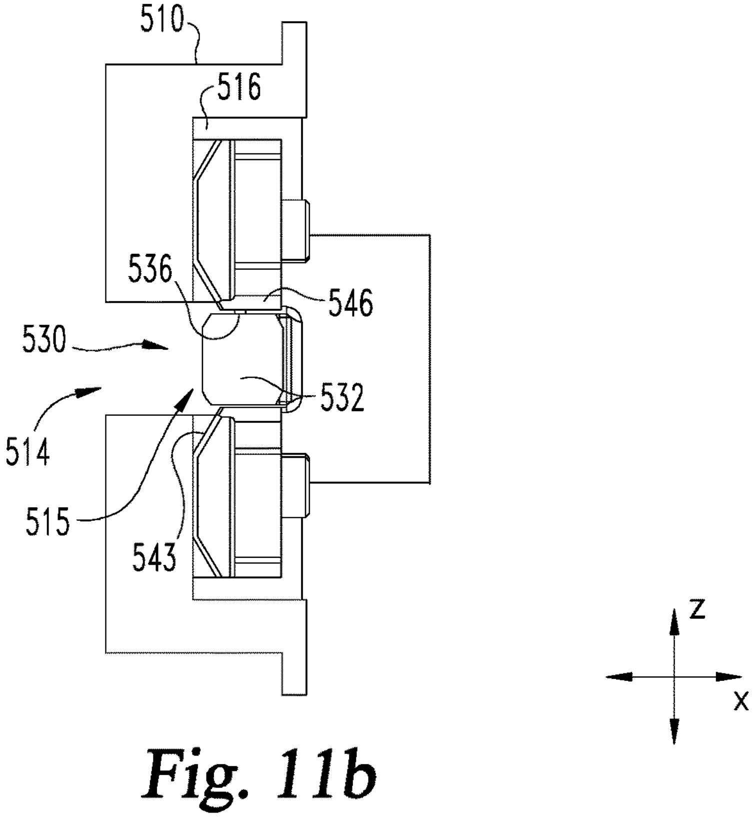

As the movable element 530 moves from the deactuating position toward the actuating position, the arm 532 travels along the axial channel 514 and enters the intersection 515, and the chamfers 534 engage the ramps 543 and urge the sliders 542 to the actuated positions. When the movable element 530 reaches the actuating position, the sides 536 of the arm 532 engage the tips 546 of the sliders 542, thereby retaining the sensor 540 in the actuated sensor state (FIG. 11).

In the illustrated form, the sensor 540 includes two sliders 542, each of which is movably seated in a corresponding one of the sections 518. In certain forms, both of the sliders 542 may be biased toward the non-actuated position, for example by springs. In other forms, only the active slider 542 may be biased toward the non-actuated position. In further embodiments, the inactive slider may be omitted. Furthermore, while the subassembly 500 is illustrated as an inner subassembly provided at the inner chassis assembly 230, it is also contemplated that the subassembly 500 may be an outer subassembly provided at the outer chassis assembly 210. In such forms, the hub 510 may include a recess corresponding to the outer hub unlocking section 213U, and the movable element 530 may correspond to the locking lug 246.

Figure 12:
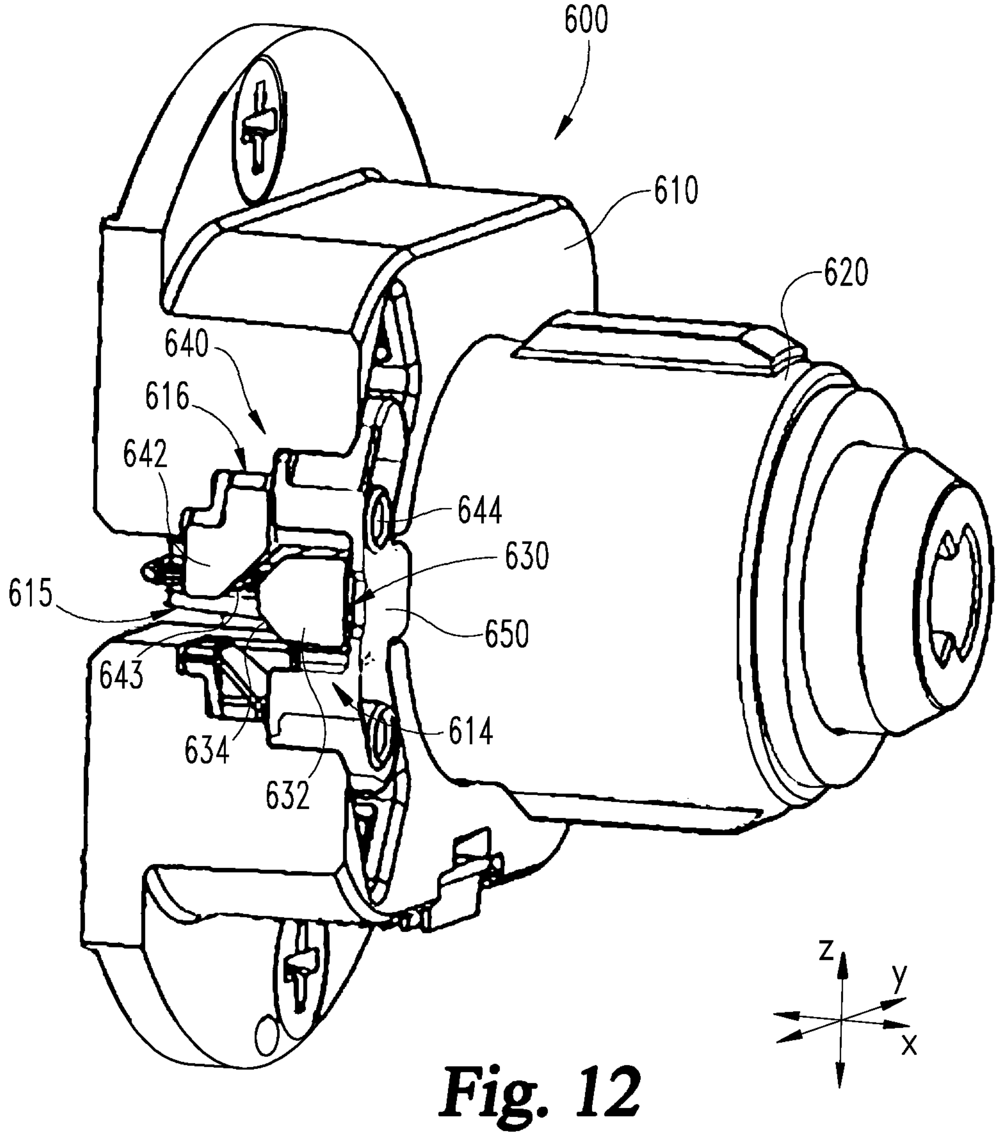
FIG. 12 is a partial cutaway illustration of a chassis subassembly according to another embodiment in a non-actuated state.
Figure 13:
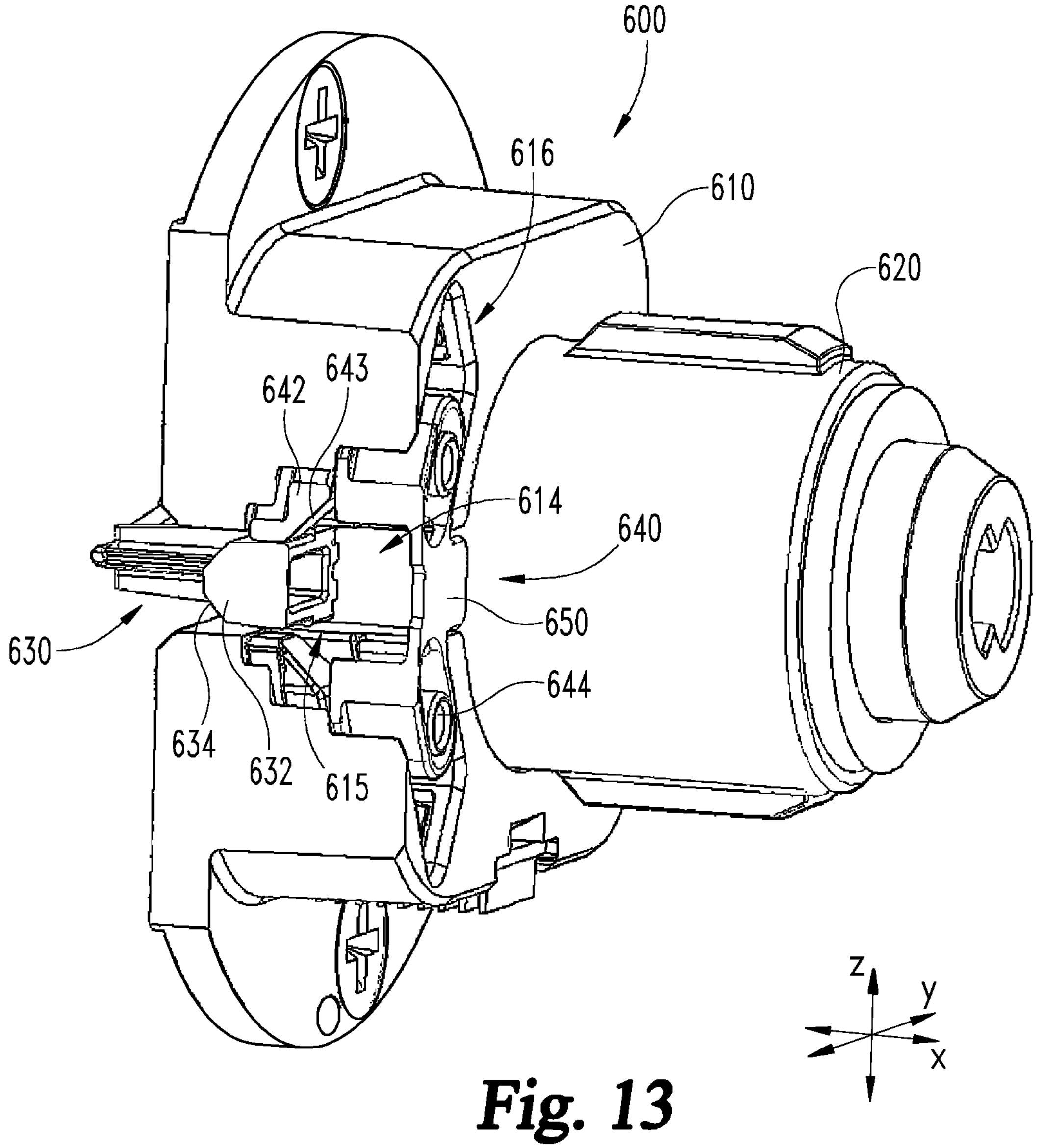
FIG. 13 is a partial cutaway illustration of the chassis subassembly of FIG. 12 in an actuated state.

FIGS. 12 and 13 illustrate a chassis subassembly 600 according to another embodiment.

The subassembly 600 is substantially similar to the subassembly 500 described above. Unless indicated otherwise, similar reference characters are used to indicate similar elements and features. For example, the subassembly 600 includes a hub 610, a spindle 620, a movable element 630, a sensor 640 associated with the movable element 630, and a retainer 650 retaining the sensor 640 in a guide channel 616 of the hub 610. In the interest of conciseness, the following description focuses primarily on features of the subassembly 600 which are different from those described above with reference to the subassembly 500.

In the illustrated form, the longitudinal channel 614 extends longitudinally outward beyond the intersection 615 with the guide channel 616, and is defined in part by the retainer 650. Additionally, the deactuating and actuating positions of the movable element 630 are the opposite of those illustrated in the above-described subassembly 500. More specifically, while the movable element 530 has a longitudinally inward deactuating position (FIG. 10) and a longitudinally outward actuating position (FIG. 11), the movable element 630 of the instant embodiment has a longitudinally outward deactuating position (FIG. 12) and a longitudinally inward actuating position (FIG. 13). Due to the reversal of these positions, the relative locations of the chamfers 634 and ramps 643 are also reversed such that the ramps 643 face the movable element 630 and the chamfers 634 faces the sensor 640. More specifically, the chamfers 634 are formed on the longitudinally inward side of the movable element arm 632, and the ramps 643 are formed on the longitudinally outward side of the sliders 642.

FIG. 12 illustrates the subassembly 600 in a non-actuated state, in which the movable element 630 is in the deactuating position. As a result, the slider 642 is in the non-actuated position and the sensor 640 is in the non-actuated state. With the subassembly 600 in the non-actuated state, the movable element 630 is positioned in the longitudinal channel 614 on the longitudinally outward side of the intersection 615 with the guide channel 616. More specifically, the movable element 630 is located in the portion of the longitudinal channel 614 that is defined in part by the retainer 650. Additionally, the active slider 642 extends into the longitudinal channel 614 such that the ramp 643 is located in the intersection 615.

FIG. 13 illustrates the subassembly 600 in an actuated state, in which the movable element 630 has been moved to the actuating position. As the movable element 630 moves longitudinally inward from the non-actuated position toward the actuated position, the arm 632 enters the intersection 615 and the chamfer 634 engages the ramp 643, thereby urging the active slider 642 toward the actuated position. As a result, the sensor 640 has been transitioned from the non-activated sensor state to the activated sensor state. When the movable element 630 returns to the deactuating position, for example due to movement of a lock control assembly, the active slider 642 returns to the non-actuated position, thereby returning the subassembly 600 to the non-actuated state illustrated in FIG. 12.

Figure 14:
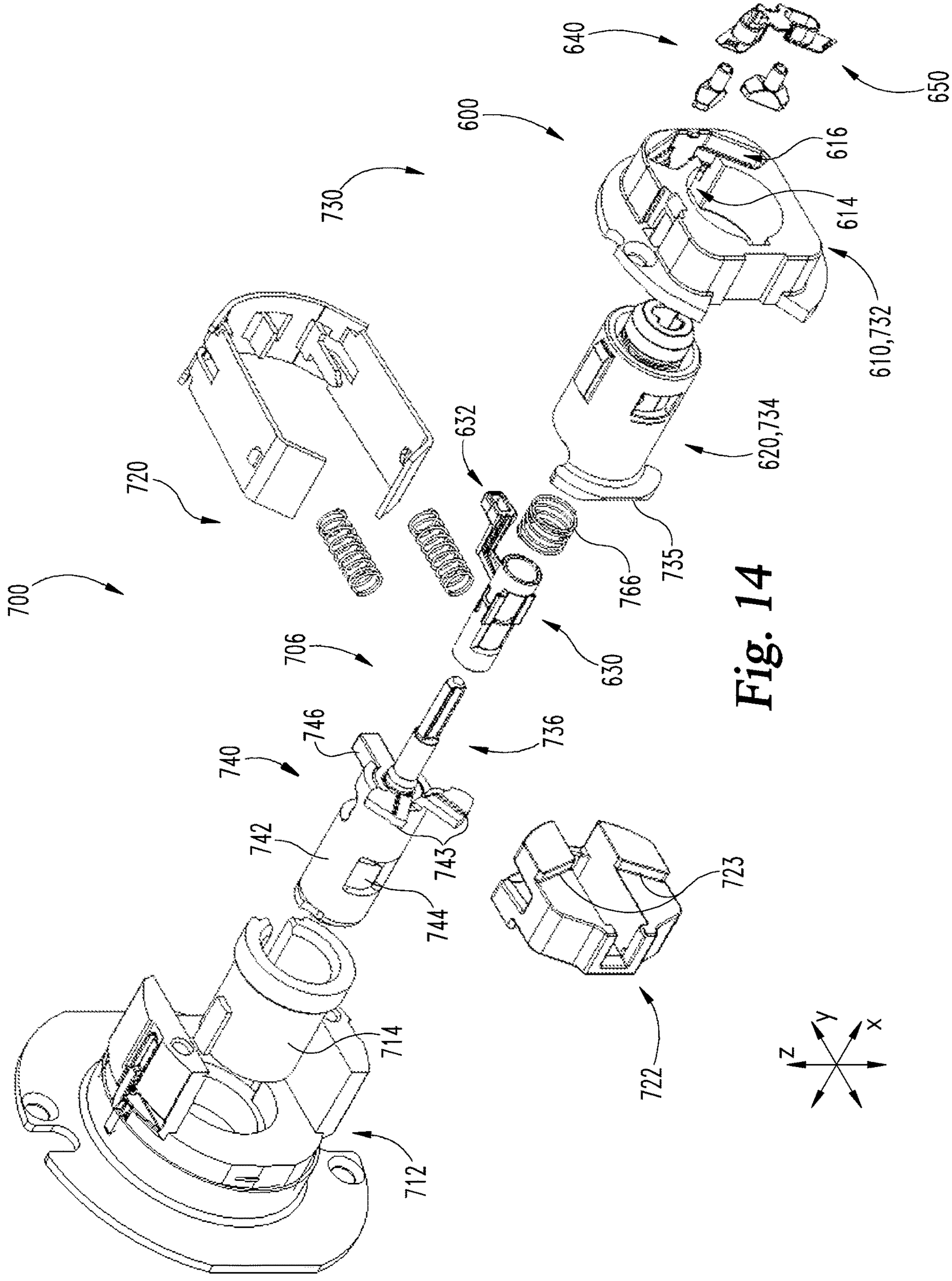
FIG. 14 is an exploded assembly view of a chassis including the subassembly illustrated in FIG. 12.

FIG. 14 illustrates a chassis 700 according to another embodiment. The chassis 700 is substantially similar to the chassis 200 described above. Unless indicated otherwise, similar reference characters are used to denote similar elements and features. For example, the chassis 700 includes a lock control assembly 702, an outer chassis assembly 710, a retractor assembly 720, and an inner chassis assembly 730. In the interest of conciseness, the following description focuses primarily on features of the chassis 700 which are different from those described above with reference to the chassis 200.

In the illustrated embodiment, the inner chassis assembly 730 includes the above-described subassembly 600, such that the inner hub 732 corresponds to the hub 610, and the inner drive tube 734 corresponds to the spindle 620. Additionally, the lock control assembly 702 includes the movable element 630, which is provided in the form of a longitudinally movable plunger 630. The drive bar 736 extends through the plunger 630, and a spring 766 biases the plunger 630 into contact with the locking lug 746. As a result, the plunger 630 moves with the locking lug 746, and the position of the plunger 630 corresponds to the state of the lock control assembly 702. Furthermore, a single drive bar 736 performs the functions of the above-described drive bar 238 and outer key cam stem 245.

Figure 15:
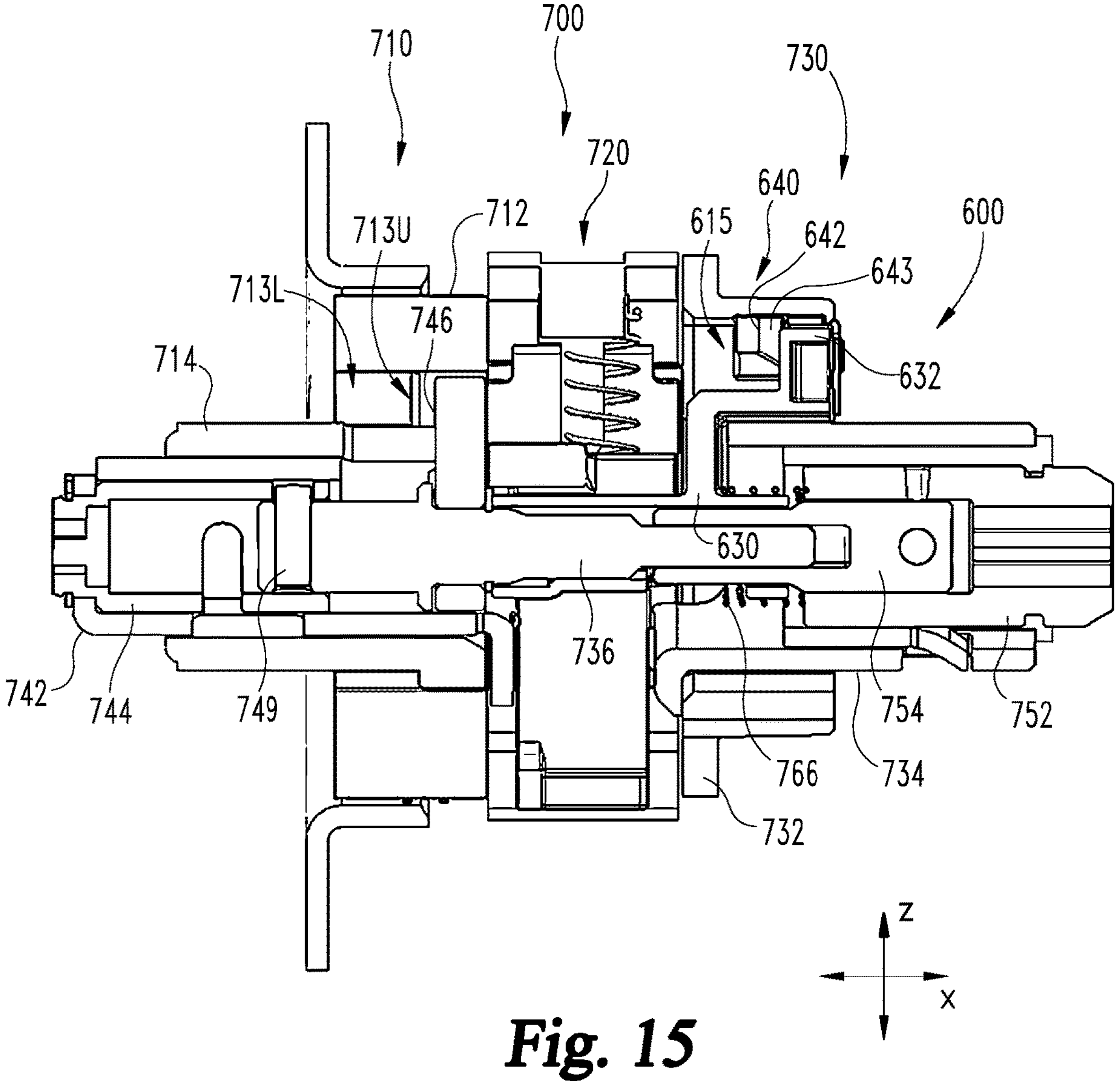
FIGS. 15 and 16 are partial cross-sectional illustrations of the chassis illustrated in FIG. 14 in an unlocked state and a locked state, respectively.

FIG. 15 illustrates the chassis 700 in an unlocked state in which the lock control assembly 702 is in the unlocking state, which includes the unlocking position of the locking lug 746. In the unlocking position, the locking lug 746 is received in the unlocking section 713U of the hub recess 713. With the locking lug 746 in the unlocking position, the plunger 630 is set to the deactuating position. In the deactuating position, the plunger 630 is disengaged from the slider 642, thereby setting the sensor 640 to the non-actuated state.

Figure 16:
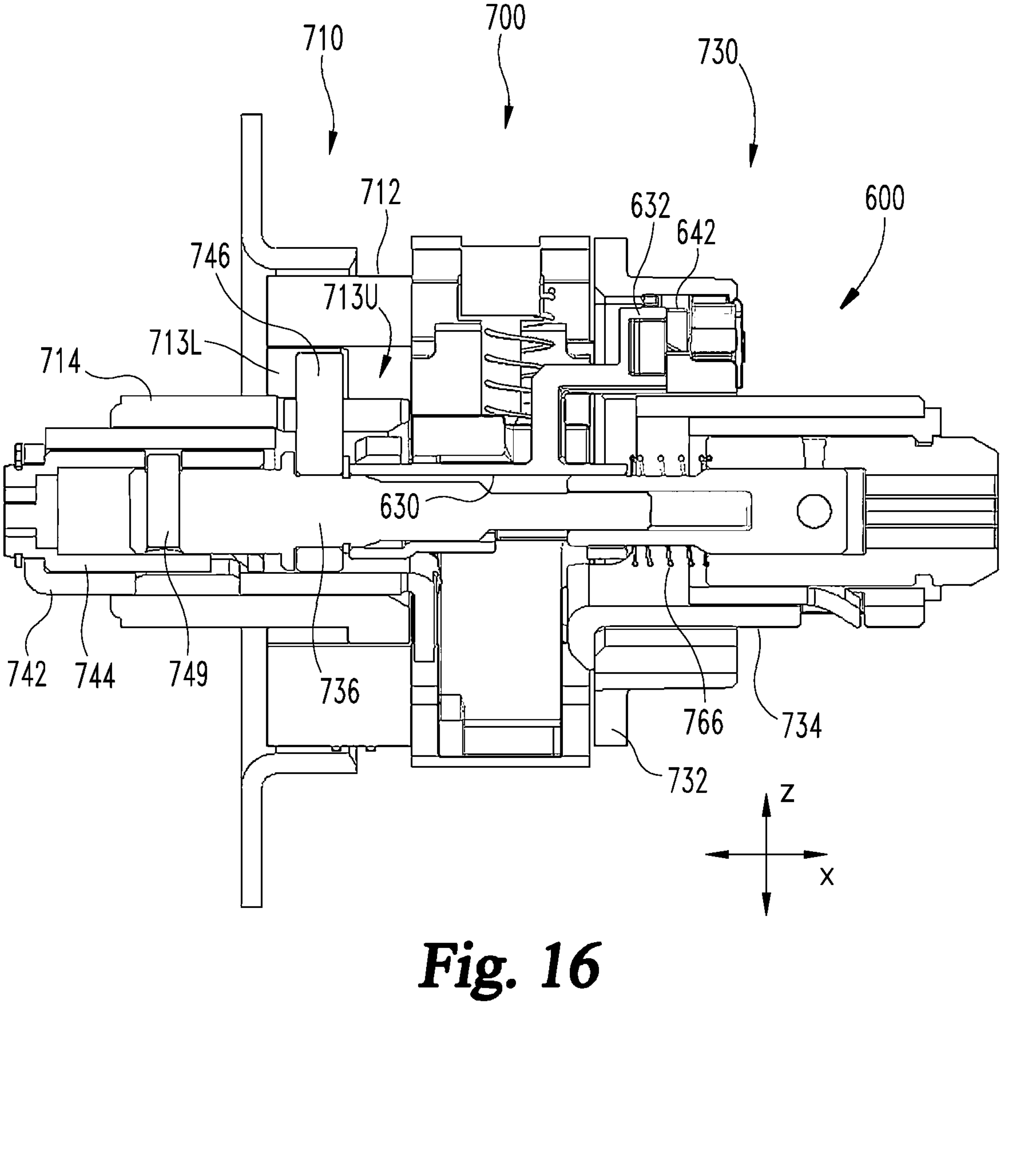

FIG. 16 illustrates the chassis 700 in a locked state, in which the lock control assembly 702 is in the locking state, which includes the locking position of the locking lug 746.

In the locking position, the locking lug 746 is received in the locking section 713L of the hub recess 713. With the locking lug 746 in the locking position, the plunger 630 is set to the actuating position. In the actuating position, the plunger 630 is engaged with the slider 642, thereby setting the sensor 640 in the actuated state.

As will be appreciated, movement of the lock control assembly 702 between the locking and unlocking states causes the plunger 630 to move between the actuating and deactuating positions under the opposing forces of the locking lug 746 and the spring 766. As a result, the non-actuated state of the sensor 740 corresponds to the unlocking state of the lock control assembly 702, and the actuated state of the sensor 740 corresponds to the locking state of the lock control assembly 702.

In certain forms, the outer chassis assembly 710 may include the above-described subassembly 500. For example, the outer hub 712 may be provided in the form of the hub 510, the locking lug 746 may serve as the movable element 530, and the sensor 540 may be mounted in the outer hub 510/712 and associated with the locking lug 530/746. In such forms, the locking lug 746 unlocking position (FIG. 15) may correspond to the movable element 540 deactuating position (FIG. 10), and the locking lug 746 locking position (FIG. 16) may correspond to the movable element 540 actuating position (FIG. 11). As a result, the non-actuated state of the sensor 540 corresponds to the unlocking state of the lock control assembly 702, and the actuated state of the sensor 540 corresponds to the locking state of the lock control assembly 702.

Figure 17:
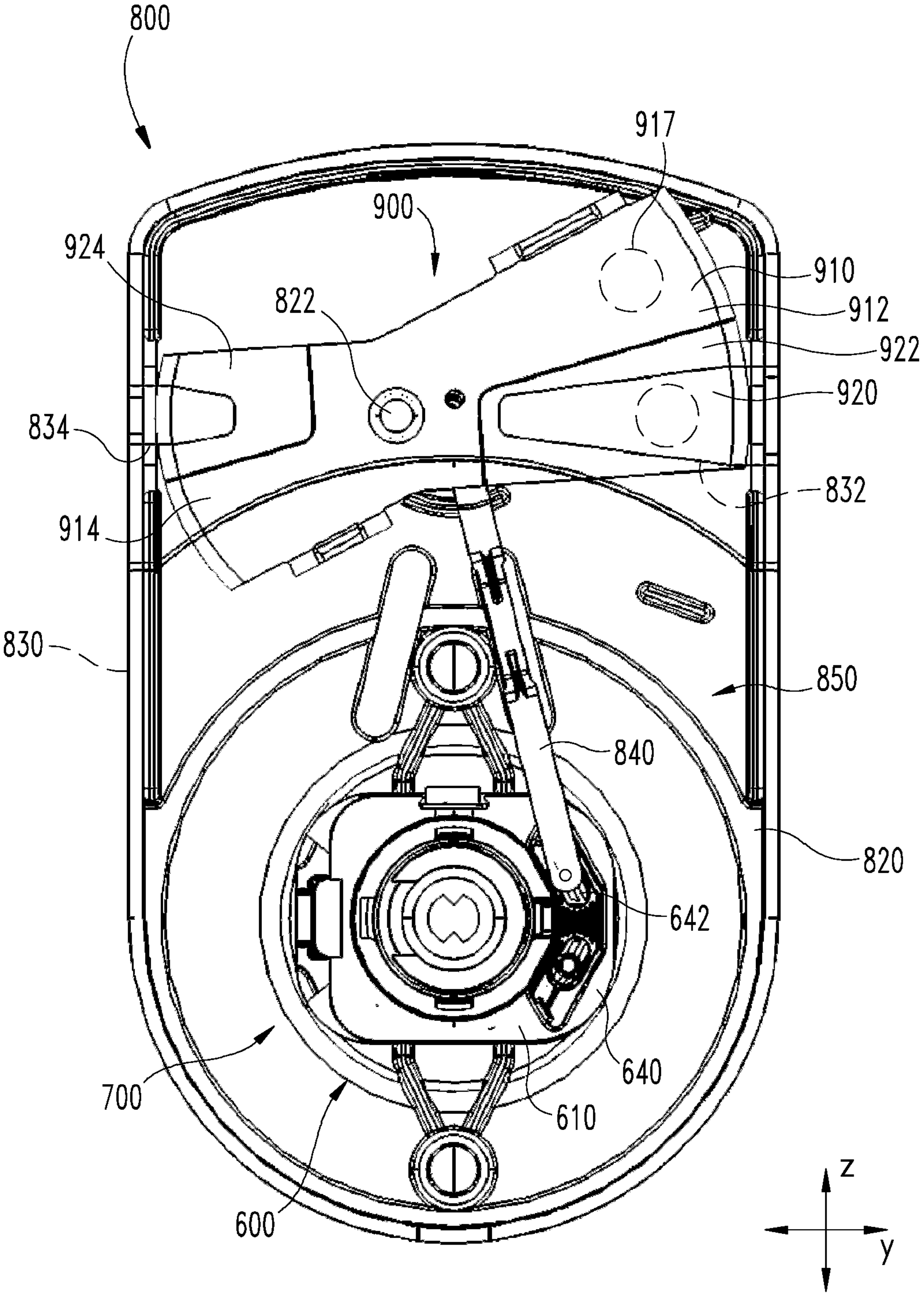
FIG. 17 is a plan view of a portion of a lockset including the chassis illustrated in FIG. 14.

FIG. 17 illustrates an escutcheon assembly 800 according to one embodiment. The escutcheon assembly 800 is mounted on the above-described chassis 700 and is engaged with the chassis subassembly 600. The assembly 800 includes a mounting plate 820 mounted on the hub 610, an escutcheon 830 coupled to the mounting plate 820, a linkage 840 coupled to the sensor 640, and an indicator plate 900 coupled to the linkage 840. In certain forms, the assembly 800 may be provided as an outer assembly, such as the outer assembly 110 described above with reference to FIG. 1. In other forms, the assembly 800 may be provided as an inner assembly, such as the inner assembly 130 described above with reference to FIG. 1. Additionally, the sensor 640, linkage 840, and indicator plate 900 may be considered to form a status indicating assembly 850 corresponding to the status indicating assembly 300 described above. For example, the sensor 310 may be provided as the sensor 640, the transmission 320 may be provided as the linkage 840, and the indicator 330 may be provided as the indicator plate 900.

The mounting plate 820 includes a post 822, and the indicator plate 900 is pivotally mounted on the post 822. The indicator plate is biased toward a non-actuated indicator plate position, and is pivotable to an actuated indicator plate position. The indicator plate 900 is connected to the active slider 642 of the sensor 640 via the linkage 840 such that the position of the indicator plate 900 corresponds to that of the active slider 642. For example, while FIG. 17 illustrates the slider 642 and the indicator plate 900 in the actuated position, movement of the slider 642 to the non-actuated slider position causes the linkage 840 to pivot the indicator plate 900 to the non-actuated indicator plate position.

The escutcheon 830 includes a primary window 832 and a secondary window 834, and a portion of the indicator plate 900 is visible through each of the windows 832, 834. As will be appreciated, the visible portion of the indicator plate 900 corresponds to the position of the indicator plate 900. For example, a non-actuated plate portion 910 is visible with the indicator plate 900 in the non-actuated position, and an actuated plate portion 920 is visible with the indicator plate 900 in the actuated position. More specifically, each of the plate portions 910, 920 includes a primary indicating region 912, 922 which is selectively visible through the primary window 832, and a secondary indicating region 914, 924 which is selectively visible through the secondary window 834. Each of the primary indicating regions 912, 922 may further include a lip 913, 923 selectively visible through a side of the primary window 832, and each of the secondary indicating regions 914, 924 may further include a lip 915, 925 selectively visible through a side of the secondary window 834. As described in further detail below, the visible portion of the indicator plate 900 corresponds to the state of the lock control assembly 702, thereby indicating to a user whether the lockset is locked or unlocked.

Figure 18:
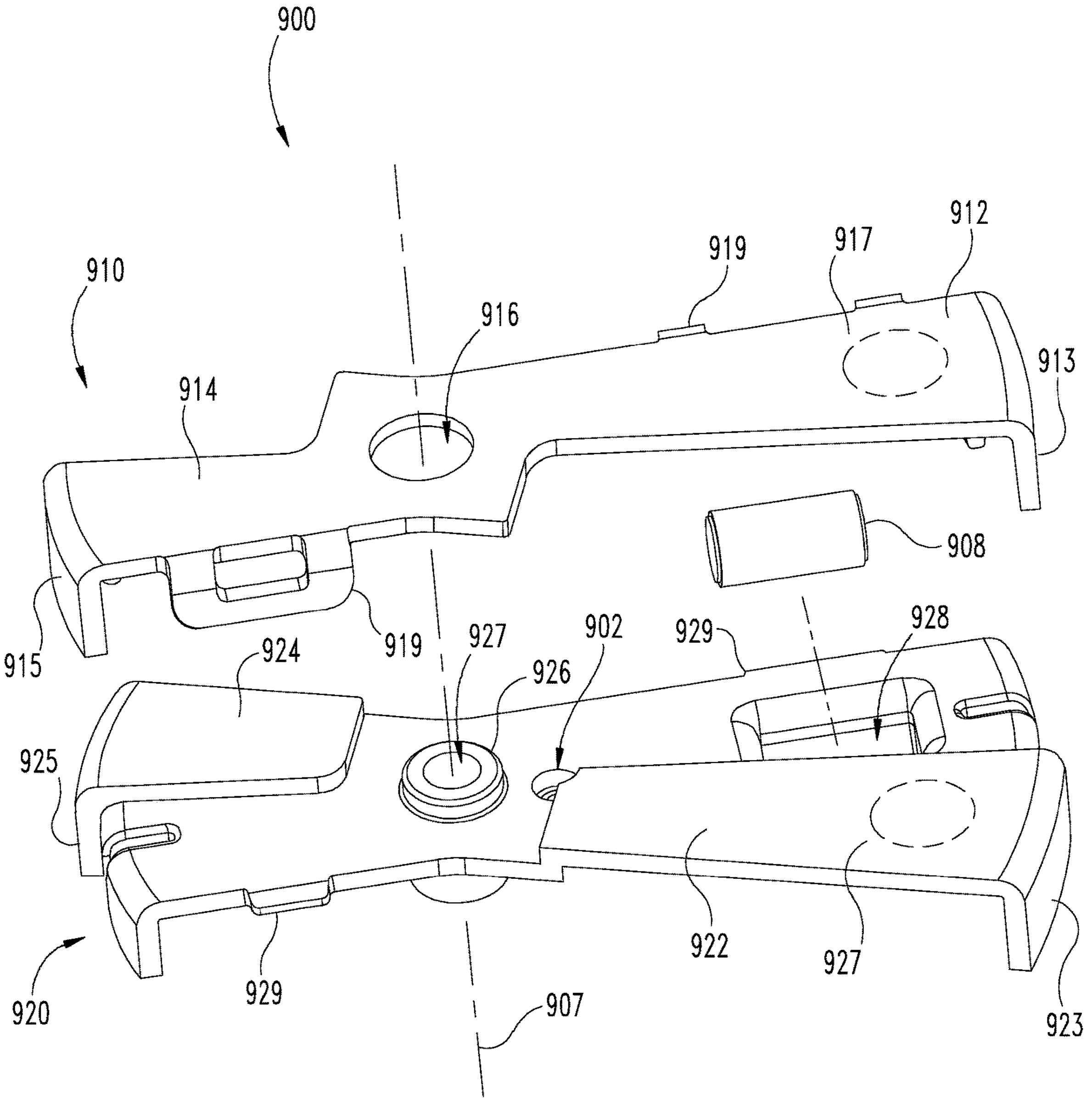
FIG. 18 is an exploded assembly view of an indicator plate according to one embodiment.

With additional reference to FIG. 18, the indicator plate 900 includes the non-actuated plate portion 910 and the actuated plate portion 920, and may further include a weight 908. The plate portions 910, 920 may include indicia which indicate to a user the state of the lockset. For example, if the non-actuated position of the indicator plate 900 corresponds to a locking state, the non-actuated plate portion 910 may include indicia 917 relating to a locked condition and the actuated plate portion 920 may include indicia 927 relating to an unlocked condition. By way of non-limiting example, the indicia 917, 927 may include colors, symbols, graphics, letters, or a combination thereof.

In the illustrated form, the actuated plate portion 920 is a base plate, and the non-actuated plate portion 910 is a cover plate mounted on the actuated plate portion 920. The base plate 920 may include a recess 928, and the weight 908 may be positioned in the recess 928. The plate portions 910, 920 may be coupled to one another to retain the weight 908 within the recess 928. For example, the plates 910, 920 may be releasably coupled to one another by engagement of snap features 919, 929.

The base plate or non-actuated plate portion 920 includes a boss 926, an opening 927 formed through the boss 926, and an attachment opening 902. When the plates 910, 920 are coupled to one another, the boss 926 is received in an opening 916 formed in the cover plate or actuated plate portion 910. The opening 927 is configured to receive the mounting plate post 822 to pivotally mount the indicator plate 900 to the mounting plate 820, such that the indicator plate 900 is pivotable about a pivot axis 907 with respect to the mounting plate 820. Additionally, the attachment opening 902 is configured to engage an end of the linkage 840 to couple the indicator plate 900 to the linkage 840.

In the illustrated form, the escutcheon assembly 800 is associated with the subassembly 600 of the inner chassis assembly 730, and therefore corresponds to the inner assembly 130 illustrated in FIG. 1. As noted above, the locking and unlocking states of the lock control assembly 702 respectively correspond to the actuated and non-actuated states of the sensor 640, and thus the actuated and non-actuated positions of the indicator plate 900. In other words, when the lock control assembly 702 is in the locking state, the sensor 640 is in the actuated state, and the actuated plate portion 920 is visible through the windows 832, 834. Conversely, when the lock control assembly 702 is in the unlocking state, the sensor 640 is in the non-actuated state, and the non-actuated plate portion 910 is visible through the windows 832, 834. Thus, the non-actuated plate portion 910 may include indicia relating to the unlocked condition, and the actuated plate portion 920 may include indicia relating to the locked condition.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A status-indicating lockset having a first state and a second state, the status-indicating lockset comprising:

a housing defining an opening;

a movable component mounted for movement relative to the housing, the movable component having a movable component first position in the first state and a movable component second position in the second state; and an indicator plate mounted for pivotal movement relative to the housing about a pivot axis, the indicator plate comprising a first display region that is selectively aligned with the opening, the indicator plate having an indicator plate first position in which the first display region is aligned with the opening, the indicator plate having an indicator plate second position in which the first display region is not aligned with the opening, wherein the indicator plate is biased toward one of the indicator plate first position or the indicator plate second position;

wherein the movable component is operable to engage the indicator plate at an engagement point;

wherein the engagement point is offset from the pivot axis by a first offset distance;

wherein the first display region is offset from the pivot axis by a second offset distance; and wherein the second offset distance is greater than the first offset distance such that a lesser first displacement of the movable component is translated to a greater second displacement of the first display region.

2. The status-indicating lockset of claim 1, further comprising a link extending between the movable component and the engagement point; and wherein the movable component is operable to engage the indicator plate via the link.

3. The status-indicating lockset of claim 2, wherein a first end portion of the link is pivotably coupled to the indicator plate at the engagement point; and wherein a second end portion of the link is pivotably coupled to the movable component.

4. The status-indicating lockset of claim 1, further comprising a lock element having a locking position and an unlocking position; and wherein the movable component is configured to move between the movable component first position and the movable component second position in response to movement of the lock element between the locking position and the unlocking position.

5. The status-indicating lockset of claim 1, wherein the first display region comprises a first indicium relating to the first state of the status-indicating lockset.

6. The status-indicating lockset of claim 5, wherein the indicator plate further comprises a second indicium relating to the second state of the status-indicating lockset;

wherein, with the indicator plate in the indicator plate first position, the second indicium is not visible via the opening; and wherein, with the indicator plate in the indicator plate second position, the second indicium is visible via the opening.

7. The status-indicating lockset of claim 1, wherein, with the indicator plate in the indicator plate second position, a second display region of the indicator plate is visible via the opening; and wherein the second display region comprises a second indicium relating to the second state of the status-indicating lockset.

8. A method, comprising:

in response to movement of a lockset from a first state to a second state, exerting a force on a pivotable indicator plate at an engagement point that is offset from a pivot axis of the indicator plate by a first offset distance, thereby causing the engagement point to move by a first displacement distance; and in response to the force, pivoting the indicator plate from an indicator plate first position to an indicator plate second position, thereby causing a first indicium of the indicator plate to move by a second displacement distance;

wherein the first indicium is offset from the pivot axis by a second offset distance;

wherein the second offset distance is greater than the first offset distance such that the second displacement distance is greater than the first displacement distance; and wherein the method further comprises biasing the indicator plate toward one of the indicator plate first position or the indicator plate second position.

9. The method of claim 8, further comprising:

with the indicator plate in the indicator plate first position, displaying the first indicium via an opening of the lockset; and wherein, with the indicator plate in the indicator plate second position, the first indicium is not displayed via the opening.

10. The method of claim 9, further comprising:

with the indicator plate in the indicator plate second position, displaying a second indicium via the opening; and wherein, with the indicator plate in the indicator plate first position, the second indicium is not displayed via the opening.

11. The method of claim 10, wherein the indicator plate further comprises the second indicium.

12. The method of claim 8, wherein exerting the force comprises exerting the force via a link that extends between a movable component and the engagement point; and wherein the movable component moves from a movable component first position to a movable component second position as the lockset moves from the first state to the second state.

13. The method of claim 8, wherein the lockset comprises a lock element having a lock element first position corresponding to the first state of the lockset and a lock element second position corresponding to the second state of the lockset; and wherein the force is exerted as a result of movement of the lock element from the lock element first position to the lock element second position.

14. A lockset, comprising:

a housing comprising an opening;

an indicator plate mounted for pivotal movement about a pivot axis between an indicator plate first position and an indicator plate second position, wherein with the indicator plate in the indicator plate first position, a first indicium of the indicator plate is aligned with the opening, wherein with the indicator plate in the indicator plate second position, the first indicium is not aligned with the opening, wherein the first indicium is offset from the pivot axis by a first offset distance, and wherein the indicator plate is biased toward one of the indicator plate first position or the indicator plate second position; and a movable component engaged with the indicator plate at an engagement point that is offset from the pivot axis by a second offset distance less than the first offset distance; and wherein the movable component is configured to move from a movable component first position to a movable component second position as the lockset transitions from a first state to a second state to thereby move the indicator plate from the indicator plate first position to the indicator plate second position.

15. The lockset of claim 14, wherein the movable component is a lock element of the lockset.

16. The lockset of claim 15, wherein the lock element is engaged with the indicator plate via at least one intermediate component.

17. The lockset of claim 14, wherein the engagement point is between the pivot axis and the indicium such that the indicator plate defines a third class lever.

18. The lockset of claim 14, wherein, with the indicator plate in the indicator plate first position, a second indicium is not visible via the opening; and wherein, with the indicator plate in the indicator plate second position, the second indicium is visible via the opening.

19. The lockset of claim 18, wherein the indicator plate comprises the second indicium.

* * * * *